United States Patent
Shinomi

(10) Patent No.: US 8,185,878 B2
(45) Date of Patent: *May 22, 2012

(54) PROGRAM MAINTENANCE SUPPORT DEVICE, PROGRAM MAINTENANCE SUPPORTING METHOD, AND PROGRAM FOR THE SAME

(75) Inventor: Hideaki Shinomi, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 977 days.

This patent is subject to a terminal disclaimer.

(21) Appl. No.: 12/175,802

(22) Filed: Jul. 18, 2008

(65) Prior Publication Data

US 2008/0295080 A1   Nov. 27, 2008

Related U.S. Application Data

(63) Continuation of application No. 12/054,533, filed on Mar. 25, 2008, now Pat. No. 8,006,229, which is a continuation of application No. 10/860,415, filed on Jun. 3, 2004, now Pat. No. 7,363,613.

(30) Foreign Application Priority Data

Jun. 23, 2003 (JP) .................................. 2003-177776

(51) Int. Cl.
*G06F 9/44* (2006.01)

(52) U.S. Cl. ......... 717/127; 112/143; 112/155; 112/159

(58) Field of Classification Search ............... 717/112, 717/127, 143, 155, 159
See application file for complete search history.

(56) References Cited

U.S. PATENT DOCUMENTS

| | | | | |
|---|---|---|---|---|
| 5,778,232 A | * | 7/1998 | Caldwell et al. | 717/156 |
| 5,845,289 A | * | 12/1998 | Baumeister et al. | 1/1 |
| 5,878,261 A | * | 3/1999 | Holler et al. | 717/157 |
| 6,742,179 B2 | * | 5/2004 | Megiddo et al. | 717/130 |
| 6,757,887 B1 | * | 6/2004 | Kaplan et al. | 717/106 |
| 6,804,682 B1 | * | 10/2004 | Kemper et al. | 1/1 |
| 6,807,548 B1 | | 10/2004 | Kemper | |

(Continued)

FOREIGN PATENT DOCUMENTS

JP       08292881       11/1996

(Continued)

OTHER PUBLICATIONS

Donald Bradley Roberts, "Practical Analysis for Refactoring", 1999.*

(Continued)

*Primary Examiner* — Phillip Nguyen
(74) *Attorney, Agent, or Firm* — Roy W. Truelson

(57) ABSTRACT

The present invention includes program storing unit 11 for storing a program, parsing/dependence-information generating unit 12 for generating dependence information and a syntax tree for a program, dependence-information storing unit 13 for storing dependence information, syntax-tree storing unit 14 for storing a syntax tree, dependence-information tracking unit 17 for extracting interface information on a program fragment according to specifying-information specifying the program fragment and extracting a part of a program fragment associated with interface information according to selection information for selecting the interface information, and information input/output unit 15 for passing specifying-information and selection information to dependence-information tracking unit 17 and outputting interface information and a part of a program fragment passed from dependence-information tracking unit 17.

10 Claims, 24 Drawing Sheets

U.S. PATENT DOCUMENTS

| | | | |
|---|---|---|---|
| 6,851,105 B1 * | 2/2005 | Coad et al. | 717/106 |
| 7,370,318 B1 | 5/2008 | Howe et al. | |
| 7,451,439 B2 | 11/2008 | Nickell et al. | |
| 7,536,080 B2 * | 5/2009 | Todo et al. | 386/263 |
| 7,543,268 B2 | 6/2009 | Cherdron et al. | |
| 7,669,188 B2 | 2/2010 | Nickell et al. | |
| 2004/0040017 A1 | 2/2004 | Kershenbaum et al. | |

FOREIGN PATENT DOCUMENTS

| | | |
|---|---|---|
| JP | 09016389 | 1/1997 |
| JP | 11-237984 | 8/1999 |

OTHER PUBLICATIONS

Xie et al., "Checking Inside the Black Box: Regression Fault Exposure and Localization Based on Value Spectra Differences", Dec. 2002.*

Deursen et al., "Refactorin Test Code", 2001.*

Michael Wolfe, "Data Dependence and Program Restructuring", Jul. 1990.*

Katsuhisa Maruyama et al., "Extracting Reusable Software Components by Using Bounded Program Slicing", Transactions of Information Processing, Society of Japan, vol. 37, No. 4, pp. 520-535, 1996.

Garrido et al., "Refactoring C with Conditional Compilation", 18th IEEE International Conference on Automated Software Engineering, 2003.

Harman et al., "Amorphous Procedure Extraction", undated.

Ishio et al, "Debugging Support for Aspect-Oriented Program Based on Program Slicing and Call Graph", Osaka University, undated.

A. Garrido, "Software Refactoring Applied to C Programming Language", Thesis, University of Illinois at Urbana-Champaign, 2000.

* cited by examiner

Figure 2

```
1:   get(n1,n2);
2:   get(aaa);
3:   yyy := aaa;
       .
       .
4:   max := n1;
5:   min := n1;
6:   ttt := yyy / 2;
7:   xxx := ttt;
8:   if n1 < n2 then
9:       max := n2;
10:  else
11:      min := n2;
12:  end if;
       .
       .
13:  zzz := xxx;
       .
       .
14:  put(min);
15:  put(max);
16:  put(zzz);
```

Figure 4

```
get (n1, n2);
get (aaa);
yyy := aaa;
    :
```
```
       ┌─────────────────────────┐
   →│n1│ max := n1;              │
   →│yyy│min := n1;              │
   →│n2│ ttt := yyy / 2;         │
       │ xxx := ttt;             │
       │ if n1 < n2 then         │
       │    max := n2;           │
       │ else              ┌───┐ │
       │    min := n2;     │xxx│→│
       │ end if;           │max│→│
       └───────────────────│min│→┘
```
```
    :
zzz := xxx;
    :
put (min);
put (max);
put (zzz);
```

Figure 7

(A) DATA STRUCTURE REPRESENTING STATEMENT

| STATEMENT ID |
|---|
| CONTROL DEPENDENCE FORWARD POINTER LIST |
| CONTROL DEPENDENCE BACKWARD POINTER |
| DATA DEPENDENCE FORWARD POINTER LIST |
| VARIABLE LIST |
| IN-SCOPE FLAG |

(B) DATA STRUCTURE REPRESENTING VARIABLE

| VARIABLE ID |
|---|
| POINTER TO STATEMENT |
| DATA DEPENDENCE BACKWARD POINTER LIST |

Figure 23

(A) WHEN INPUT/OUTPUT IS NOT PARAMETERIZED:

```
get(n1, n2);
get(aaa);
yyy := aaa;
    :
call max_min;
ttt := yyy / 2;
xxx := ttt;
    :
zzz := xxx;
    :
put(min);
put(max);
put(zzz);
    :
```

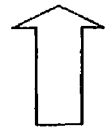

```
procedure max, min;
    max := n1;
    min := n1;
    if n1 < n2 then
        max := n2;
    else
        min := n2;
    end if;
end;
```

(B) WHEN INPUT/OUTPUT IS PARAMETERIZED:

```
get(n1, n2);
get(aaa);
yyy := aaa;
    :
call max_min (n1, n2, max, min);
ttt := yyy / 2;
xxx := ttt;
    :
zzz := xxx;
    :
put(min);
put(max);
put(zzz);
    :
```

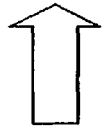

```
procedure max, min (n1, n2: integer,
                   var max, min: integer);
    max := n1;
    min := n1;
    if n1 < n2 then
        max := n2;
    else
        min := n2;
    end if;
end;
```

PROGRAM MAINTENANCE SUPPORT DEVICE, PROGRAM MAINTENANCE SUPPORTING METHOD, AND PROGRAM FOR THE SAME

CROSS REFERENCE TO RELATED APPLICATION

This is a continuation of pending U.S. patent application Ser. No. 12/054,533, filed Mar. 25, 2008, entitled "Program Maintenance Support Device and Program for the Same", which is a continuation of U.S. patent application Ser. No. 10/860,415, filed Jun. 3, 2004, entitled "Program Maintenance Support Device, Program Maintenance Supporting Method, and Program for the Same", now issued as U.S. Pat. No. 7,363,613, both of which are herein incorporated by reference. This application claims priority under 35 U.S.C. §120 of U.S. patent application Ser. No. 12/054,533, filed Mar. 25, 2008, and of U.S. patent application Ser. No. 10/860, 415, filed Jun. 3, 2004, and also claims priority under 35 U.S.C. §119 of Japanese Application 2003-177776, filed Jun. 23, 2003.

FIELD OF THE INVENTION

The present invention relates to a program maintenance support device that supports refactoring by extracting "interface information" of a specific program or program part (also referred to herein as a "program fragment").

BACKGROUND OF THE INVENTION

In recent years, refactoring has received attention especially in for use in object-oriented languages. See Martin Flower, *Refactoring: Improving the design of existing code*, Addison Wesley Longman, Inc., 1999, pp. 110-116 (see non-patent document 1, for example). Refactoring can be defined as an operation to improve the internal structure of software while keeping its external behavior. Refactoring is a concept that is also applied to procedural languages such as C and COBOL in addition to object-oriented languages.

While automation of refactoring at a level of renaming classes or methods is presently supported in development environments such as WebSphere Studio for JAVA® and the like, few other types of refactoring are automated, meaning that such refactoring is presently performed using manual operations.

Basic techniques for program analysis include program slicing (see Weiser, M. *Program Slicing*, IEEE Transactions on Software Engineering, Vol. SE-10, No. 4", 1984, pp. 352-357 and Takao Shimomura, *Program Slicing Technique and Its application to Testing, Debugging and Maintenance*, Vol. 33, No. 9, 1992, pp. 1078-1086, for example). Program slicing proposes utilization of data dependence (dependence between a variable in a program and a statement that determines the value of the variable) and control dependence (dependence between a statement in a program and a statement that determines whether the statement will be executed or not) for program analysis.

To perform refactoring, one is required to read source code and understand its operations. It is often necessary to understand the interface information of a program fragment through consideration of external input and output information. One example clearly showing the need to understand the interface information of a program fragment arises in the context of "method extraction" refactoring. A method is a particular meaningful unit that constitutes a program, also called a "sub-routine". Method extraction refactoring refers to improvement of the internal structure of a program by separating such a method from a program. Of course, the need to understand program fragment interface information is not limited to method extraction refactoring. The information is also useful for program maintenance, re-building, and debugging.

Prior art mechanisms simply consider data dependence and control dependence, and not program fragment interface information.

SUMMARY OF THE INVENTION

With those objects, the invention extracts interface information for a program fragment that is specified in a source code of a program. That is, the program maintenance support device of the invention comprises accepting means for accepting specifying information for specifying a particular program fragment forming a program (corresponding to the function of accepting specifying information of information input/output unit 15), extracting means for extracting interface information on an interface with external of the program fragment specified by the specifying information accepted by the accepting means (corresponding to dependence-information tracking unit 17), and outputting means for outputting the interface information extracted by the extracting means (corresponding to the function of outputting interface information of information input/output unit 15).

The extracting means may extract as interface information input variables for storing values given to the program fragment from external and output variable for storing values to be given to external from the program fragment.

The extracting means may also extract, among variables contained in the program fragment, variables such that a statement determining their value is not contained in the program fragment, as input variables, and extract variables such that a statement using their value is not contained in the program fragment, as output variables.

The device further comprises dependence-information generating means (corresponding to the function of generating dependence information of the parsing/dependence-information generating unit 12) for generating information on data dependence between a statement and a variable contained in a program, and the extracting means may determine a statement which determines the value of a variable and a statement which uses the value of a variable based on data dependence information generated by the dependence-information generating means.

The outputting means may further output input variables and output variables extracted by the extracting means in distinction from each other.

From another point of view, the invention selects a particular piece of interface information from interface information for a program fragment, thereby extracting only a portion from the program fragment that is relevant to the selected interface information. That is, the program maintenance support device of the invention comprises accepting means for accepting selection information for selecting a particular piece of interface information from interface information on interface with external of a program fragment forming a program (corresponding to the function of accepting selection information of the information input/output unit 15), extracting means for extracting a specific part of the program fragment that is relevant to the interface information selected by the selection information accepted by the accepting means (which corresponds to the dependence-information tracking unit 17), and outputting means for outputting the specific part extracted by the extracting means in distinction from a part that has not been extracted by the extracting means (corresponding to the function of outputting an extracted method of the information input/output unit 15).

If an output variable that stores a value to be given to external from the program fragment is selected as interface information, the extracting means may determine that a statement relevant to determination of the value of the output variable is extracted as the specific part among statements contained in the program fragment.

The device further comprises dependence-information generating means for generating information on data dependence between a statement and a variable contained in the program and information on control dependence between statements contained in the program (corresponding to the function of generating dependence information of the parsing/dependence information generation 12), and the extracting means may determine a statement that is relevant to determination of the value of the selected output variable based on data dependence information and control dependence information generated by the dependence-information generating means.

Also, the extracting means may determine whether there is data dependence or control dependence between a statement which it decided to extract as a specific part and a statement which it has not decided to extract as the specific part among statements contained in the program fragment, based on data dependence information and control dependence information generated by the dependence-information generating means, and if there is data dependence or control dependence, may determine that the statement which it decided to extract as the specific part will not be extracted as the specific part.

Further, the outputting means may separate the specific part extracted by the extracting means or a part that has not been extracted by the extracting means as a method, and describe an instruction for calling the method in the program fragment.

Further, the outputting means may add as a parameter, interface information on interface with external of the part separated as a method to the instruction for calling the method.

The device may further comprise parsing means for generating a syntax tree by parsing a program (corresponding to the function of parsing of the parsing/dependence-information generating unit 12) and syntax tree modification means for modifying a syntax tree generated by the parsing means such that the specific part extracted by the extracting means is output in distinction from a part that has not been extracted by the extracting means (corresponding to the syntax tree modification unit 18).

Meanwhile, the invention is a method for supporting program maintenance, comprising the steps of generating information on data dependence between a statement and a variable contained in a program and storing the information in storing means (corresponding to step 101), accepting specifying information that specifies a particular program fragment forming the program (corresponding to step 102), extracting interface information on interface with external of the program fragment specified by the accepted specifying information based on data dependence information stored in the storing means (corresponding to step 103), and outputting the extracted interface information (corresponding to step 104).

The method may further comprise steps of generating information on control dependence between statements contained in the program and storing the information in the storing means (corresponding to step 201), accepting selection information selecting a particular piece of interface information from outputted interface information (corresponding to step 208), extracting a specific part of the program fragment that is relevant to the interface information selected by the accepted selection information based on data dependence information and control dependence information stored in the storing means (corresponding to the determination of extracted portion at steps 209 to 211), and outputting the extracted specific part in distinction from a part that has not been extracted (corresponding to step 212).

The invention can be also viewed as a program for causing a computer to implement predetermined functions. That is, the program of the invention causes a computer to implement the operations of generating information on data dependence between a statement and a variable in a program and storing the information in storing means (corresponding to the function of generating dependence information of parsing/dependence-information generating unit 12), accepting specifying information that specifies a particular program fragment forming the program (corresponding to the function of accepting specification information of the information input/output unit 15), extracting interface information on interface with external of the program fragment specified by the accepted specifying information based on the data dependence information stored in the storing means (corresponding to the dependence-information tracking unit 17), and outputting the extracted interface information (corresponding to the function of outputting interface information of the information input/output unit 15).

The program may further cause the computer to implement the operations of generating information on control dependence between statements contained in the program and storing the information in the storing means (corresponding to the function of generating control dependence information of the parsing/dependence-information generating unit 12), accepting selection information that selects a particular piece of interface information from outputted interface information (corresponding to the function of accepting selection information of the information input/output unit 15), extracting a specific part of the program fragment that is relevant to the interface information selected by the accepted selection information based on data dependence information and control dependence information stored in the storing means (corresponding to the dependence-information tracking unit 17), and outputting the extracted specific part in distinction from a part that has not been extracted (corresponding to the function of outputting an extracted method of the information input/output unit 15).

BRIEF DESCRIPTION OF THE DRAWING

FIG. 2 shows a source code for use in description of the first and second embodiments;

FIG. 4 shows an output result in the first embodiment of the invention;

FIG. 7 shows data structures representing a statement and a variable in the first embodiment of the invention;

FIG. 23 shows an example of method extraction in the second embodiment of the invention.

DETAILED DESCRIPTION OF THE PREFERRED EMBODIMENTS

Description of Symbols

Figure 1:
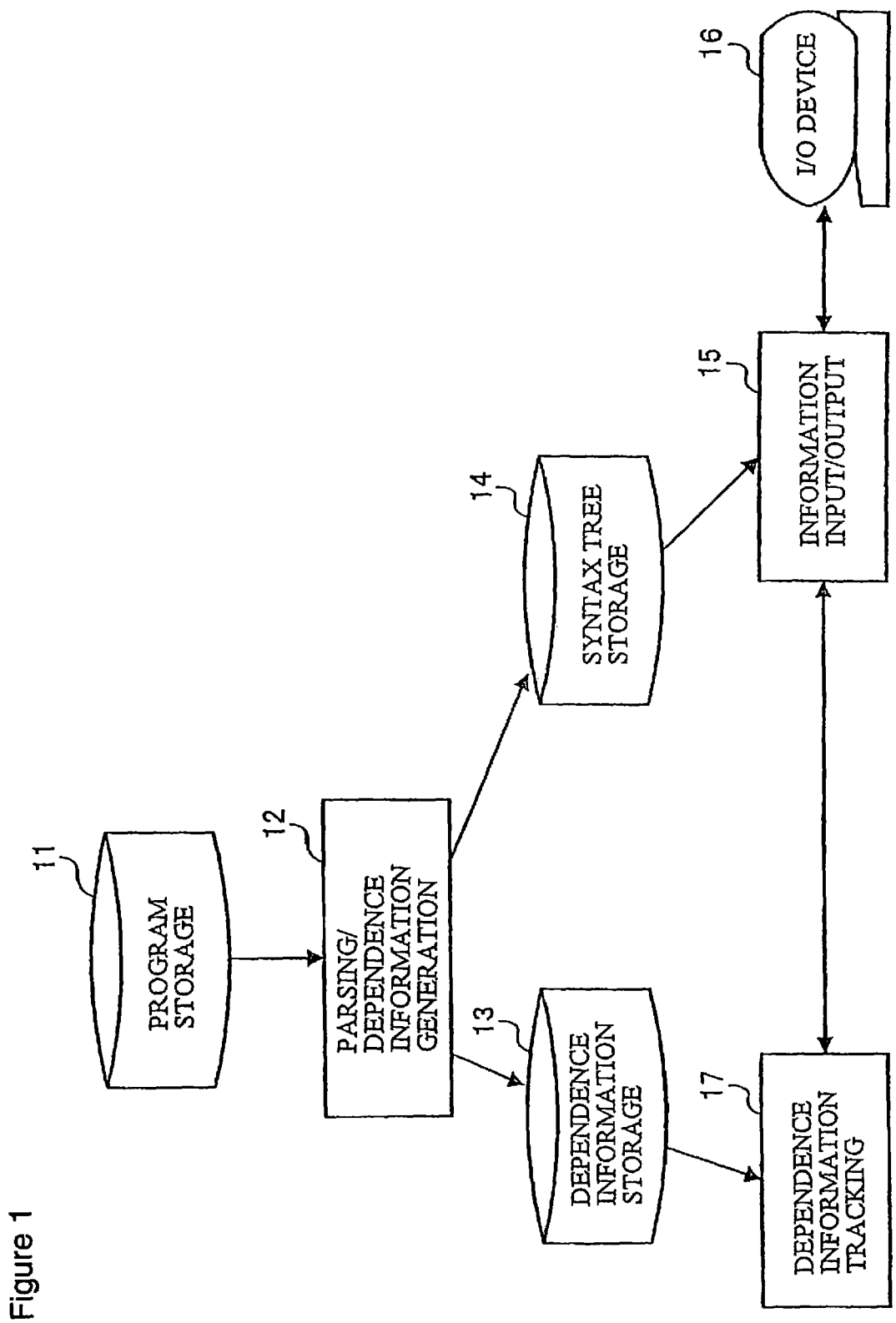
FIG. 1 is a block diagram showing the overall configuration of a first embodiment of the invention.

11 . . . Program storing unit
12 . . . Parsing/dependence-information generating unit
13 . . . Dependence information storing unit
14 . . . Syntax-tree storing unit
15 . . . Information input/output unit
16 . . . Input/output device
17 . . . Dependence-information tracking unit
18 . . . Syntax tree modification unit The invention will be described in detail based on its embodiments shown in accompanying drawings.

First Embodiment

The first embodiment relates to a method for extracting and displaying interface information for a program fragment.

FIG. 1 is a block diagram showing the overall configuration of the first embodiment. As shown, the embodiment comprises a program storing unit 11, parsing/dependence-information generating unit 12, dependence information storing unit 13, syntax-tree storing unit 14, information input/output unit 15, input/output device 16, and dependence-information tracking unit 17.

The program storing unit 11 stores source codes of programs. The parsing/dependence-information generating unit 12 is for reading and parsing source codes of programs stored in the program storing unit 11 and internally generating program dependence graphs (hereinafter referred to as "PDG") and syntax trees. A PDG is a graph that expresses control dependence between statements of a program and data dependence between statements and variables. A syntax tree represents a detailed structure of a program, which is also internally generated in language compilers.

The dependence information storing unit 13 stores PDGs generated by the parsing/dependence-information generating unit 12. The syntax-tree storing unit 14 stores syntax trees generated by the parsing/dependence-information generating unit 12.

The information input/output unit 15 is for regenerating a source code from a syntax tree stored in the syntax-tree storing unit 14 and outputting it to the input/output device 16. It also passes designation of the start statement and end statement of a program fragment by a user to the dependence-information tracking unit 17, and, further, outputs interface information received from the dependence-information tracking unit 17 to the input/output device 16.

The input/output device 16 is comprised of an input device and an output device. The input device includes a pointing device such as a keyboard and mouse, and the output device includes a display device such as a CRT display and liquid crystal display.

The dependence-information tracking unit 17 generates interface information for a program fragment passed from the information input/output unit 15 by tracking dependence information for the fragment stored in the dependence information storing unit 13, and sends the result back to the information input/output unit 15.

The embodiment is implemented by a computer system. The hardware configuration of the computer system implementing the embodiment may be of a general type that comprises a central processing device (CPU), main memory, an auxiliary storage device such as a hard disk, input device, and output device.

The auxiliary storage device stores programs for implementing the parsing/dependence-information generating unit 12, information input/output unit 15, and dependence-information tracking unit 17, and those programs are read into the main memory and executed by the CPU so that the parsing/dependence-information generating unit 12, information input/output unit 15, and dependence-information tracking unit 17 are implemented. The auxiliary storage device also functions as the program storing unit 11, dependence information storing unit 13, and syntax-tree storing unit 14.

The operation of the embodiment will be now described in detail.

The description of the embodiment assumes that the source code of a program shown in FIG. 2 is given. In figures, the program source code is written in Ada-like notation. As examples of interface information for a program fragment, the description will refer to input variables that are variables storing a value given to the program fragment from external and output variables that are variables storing a value to be given to external from the program fragment.

Figure 3:
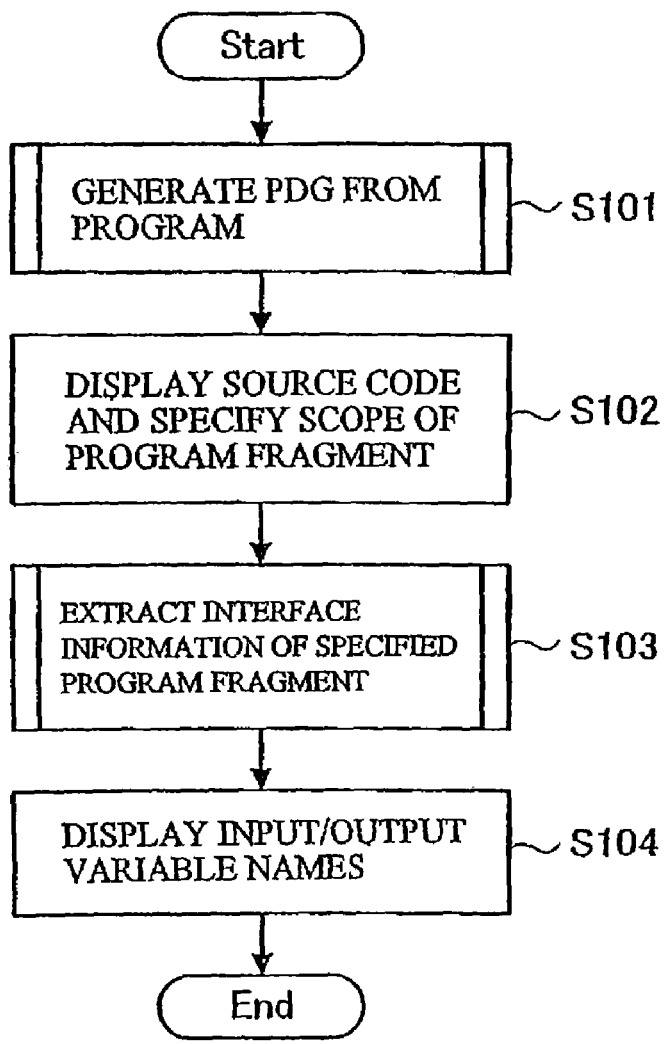
FIG. 3 is a flowchart showing the operation of the first embodiment of the invention.

FIG. 3 is a flowchart generally showing the operation of the embodiment.

First, the parsing/dependence-information generating unit 12 reads the source code of a program stored in the program storing unit 11 and generates a PDG (step 101). The PDG is stored in the dependence information storing unit 13.

After generating the PDG, the information input/output unit 15 displays the source code, and a user specifies a scope of a program fragment (step 102). This specification is done with an operation of designating with a mouse the start statement and end statement of a program fragment whose interface information the user wants to know, for example. At this point, if the user may specify a scope that cannot be separated as a method because of the syntax of the program (for example, specifying a statement in the middle of an if-then-else structure as the first or last statement), the user should be informed of it and prompted to change the specification. However, the description here assumes that the user specifies a scope that is appropriate in terms of syntax, because a scope specification can be checked for adequacy by analyzing syntax trees using background art and that is not within the scope of the invention.

Then, the dependence-information tracking unit 17 tracks the PDG stored in the dependence information storing unit 13 and extracts interface information for the specified program fragment (step 103). Assume for example that the scope indicated by the broken line is specified as a program fragment in the source code shown in FIG. 2. In the program fragment, input variables are "n1", "n2", and "yyy", and output variables are "max", "min", and "xxx". The dependence-information tracking unit 17 extracts these input variables and output variables as interface information. Variable "ttt" is neither extracted as an input variable since no value is assigned to it above the specified program fragment nor extracted as an output variable since its value is not referenced below the program fragment.

After extracting the interface information, the information input/output unit 15 receives it from the dependence-information tracking unit 17 and displays it on the input/output device 16 (step 104). Given that the scope indicated by the broken line is specified as the program fragment in the source code of FIG. 2, the interface information for the program fragment will be displayed as shown in FIG. 4, for example.

Figure 5:
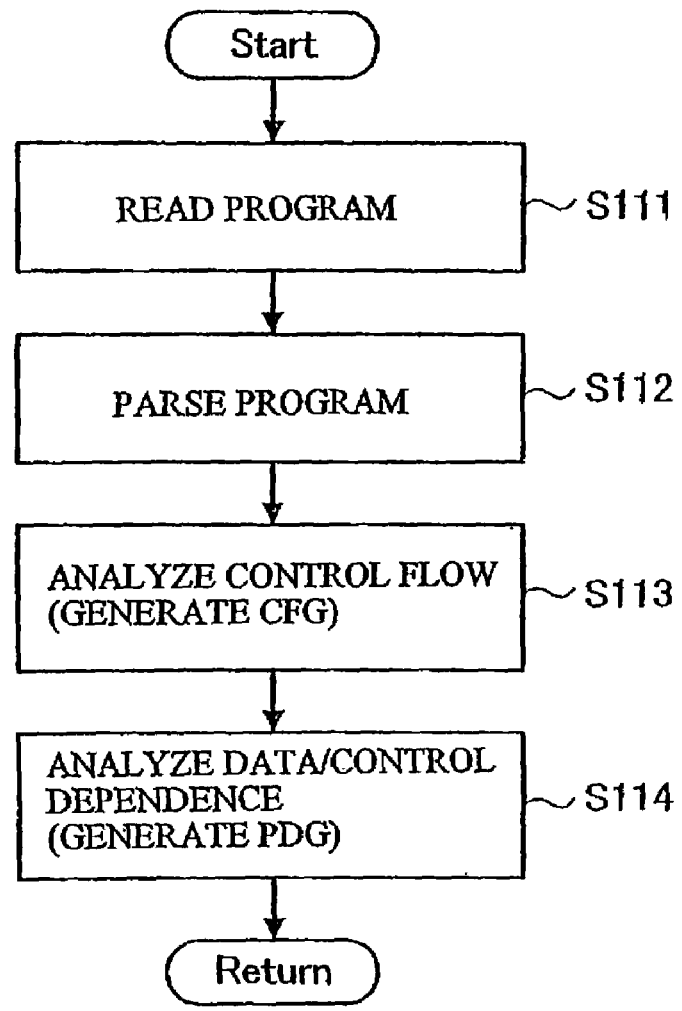
FIG. 5 is a flowchart showing PDG generation in the first embodiment of the invention.

In the following, generation of a PDG at step 101 in FIG. 3 will be described in detail with reference to FIG. 5.

The parsing/dependence-information generating unit 12 first reads the source code of a program stored in the program storing unit 11 (step 111), internally generates a syntax tree by parsing the source code (step 112), and generates a control flow graph (hereinafter referred to as "CFG") that indicates control flow among statements based on the syntax tree (step 113). A CFG is generated mainly for allowing fast analysis of data dependence in generating a PDG.

The parsing/dependence-information generating unit 12 analyzes data/control dependence for the program source code and generates a PDG (step 114).

Figure 6:
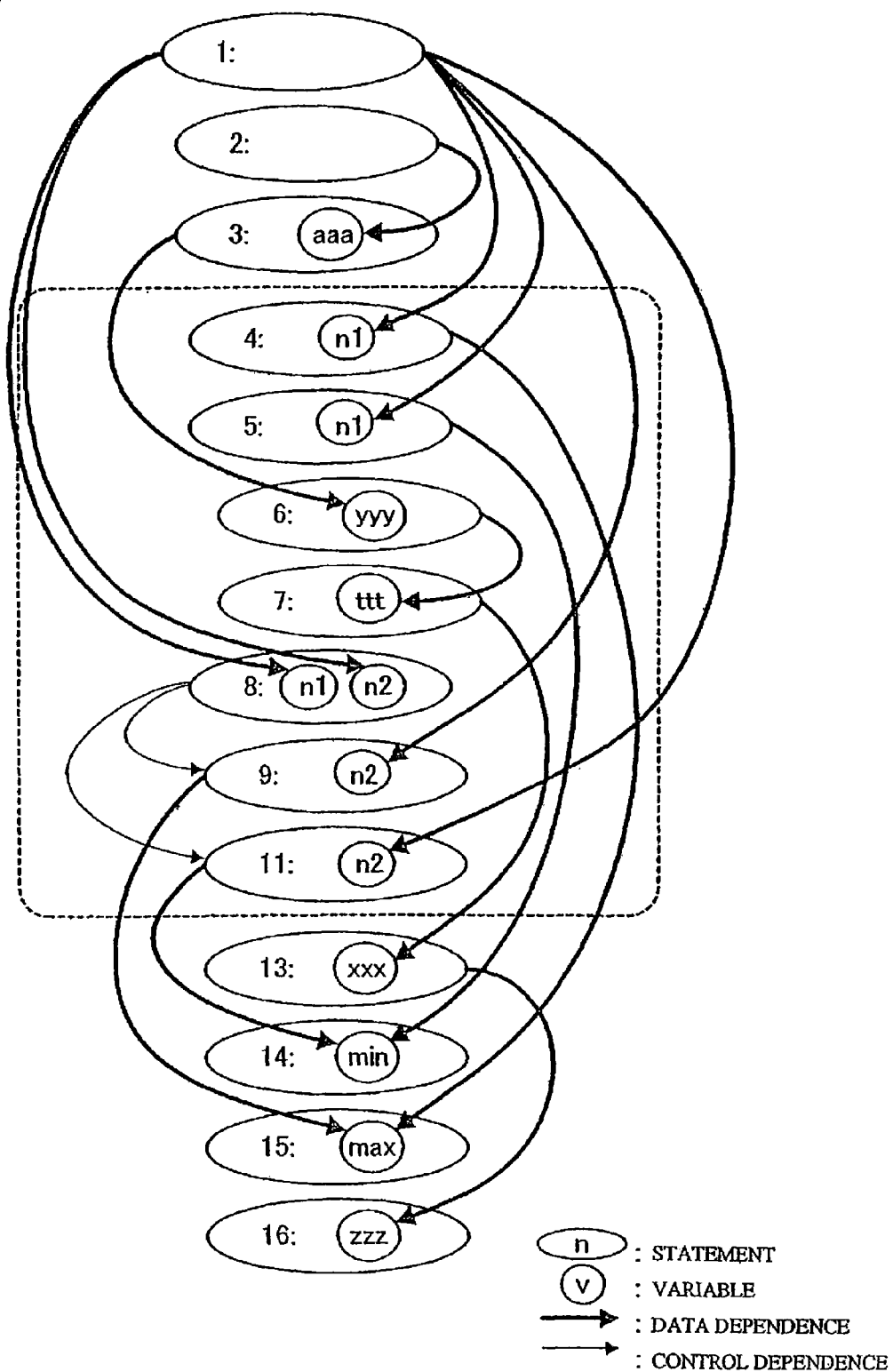
FIG. 6 shows a PDG for use in description of the first embodiment of the invention.

FIG. 6 schematically shows a PDG. FIG. 6 expresses statements by horizontal ellipses and arranges them in the order of corresponding statements, and also describes statement IDs (statement numbers) in the ellipses. Variables are expressed by circles and positioned within an ellipse of a statement that references the value of the variable, and variable names are described in the circles. When referring to a schematic diagram of a PDG such as FIG. 6, an ellipse representing a statement may be called a "node".

FIG. 6 further shows data/control dependence. Data dependence refers to dependence between a variable and a statement that determines the value of the variable; i.e. a relation between a variable and a statement. FIG. 6 shows this dependence by a thick and solid-line arrow going from a node representing a statement to a variable. Control dependence refers to dependence between a statement (sentence) and a statement (conditional sentence) that determines whether or not to execute that statement, i.e. a relation between statements. FIG. 6 shows this dependence by a thin and solid-line arrow going from a node representing a statement of a conditional sentence to a node representing a statement whose execution or non-execution is determined by that conditional sentence.

The scope of the program fragment shown by a broken line in FIG. 2 is also indicated by a broken line in FIG. 6. A variable indicated by an arrow coming into the scope from outside the scope corresponds to an input variable, and a variable indicated by an arrow going out of the scope corresponds to an output variable. Variables "n1", "n2", and "yyy" are input variables since they are indicated by incoming arrows, and "max", "min", and "xxx" are output variables since they are indicated by outgoing arrows. Variable "ttt" is indicated neither by an arrow coming into the scope nor by an arrow going out of the scope. That is, "ttt" is not extracted as an input variable or an output variable because the arrow to/from this variable starts/ends within the program fragment.

Although this example includes only control dependence relating to if-then-else, in the case of loop, control dependence is provided between a statement in a loop structure and a conditional part in the loop, because control dependence is dependence of a statement on a condition that determines whether the statement is executed or not. A loop structure can be viewed as combination of a conditional statement and a backward branch.

An example of how to manage the PDG shown in FIG. 6 within a computer will be described in detail.

Statements and variables in the PDG shown in FIG. 6 are managed with data having a data structure shown in FIG. 7, for example.

As shown in FIG. 7(A), the data structure representing a statement comprises fields for storing a statement ID, control dependence forward pointer list, control dependence backward pointer, data dependence forward pointer list, variable list, and in-scope flag.

A statement ID is a number that is assigned to uniquely identify a statement. In the following description, a statement with its statement ID "n" will be called "statement n".

The field for control dependence forward pointer list stores a pointer to a linear list if there is an arrow that shows outgoing control dependence from the node of that statement in the PDG in FIG. 6, and the linear list stores a pointer to the data structure representing the statement to which the arrow goes. Meanwhile, if there is no arrow showing such control dependence in the PDG in FIG. 6, "NULL" will be stored in the field.

The field for control dependence backward pointer stores, if there is an arrow showing incoming control dependence to the node of that statement in the PDG in FIG. 6, a pointer to a data structure representing the statement from which the arrow comes. Meanwhile, if there is no arrow showing such control dependence in the PDG in FIG. 6, "NULL" will be stored in the field.

The field for data dependence forward pointer list stores a pointer to a linear list if there is an arrow showing outgoing data dependence from the statement in the PDG in FIG. 6, and the linear list stores a pointer to the data structure representing the variable to which the arrow goes. Meanwhile, if there is no arrow showing such data dependence in the PDG in FIG. 6, "NULL" will be stored in the field.

The field for variable list stores a pointer to a linear list, which stores a pointer to a data structure representing a variable that appears in the statement.

The in-scope flag is a flag that indicates whether the statement is within a specified scope. For example, the in-scope flag is set to "0" as the initial value and is set to "1" if the statement is within a specified scope. However, any other techniques may be used as long as they can indicate whether a statement is within a scope.

Further, as shown in FIG. 7(B), the data structure representing a variable comprises fields for storing a variable ID, a pointer to a statement, and a data dependence backward pointer list.

A variable ID is a number that is assigned to uniquely identify a variable.

The field for a pointer to a statement stores a pointer to a data structure that represents the statement in which the variable appears.

The field for data dependence backward pointer list stores a pointer to a linear list when there is an arrow showing incoming data dependence to the variable in the PDG in FIG. 6, and the linear list stores a pointer to the data structure representing the statement from which the arrow comes. Meanwhile, when there is no arrow showing such data dependence in the PDG in FIG. 6, "NULL" will be stored in the field.

Thus, in the embodiment, pointers in both directions, i.e. forward and backward pointers are provided for both of data dependence and control dependence. This is because it can make subsequent algorithms faster.

Figure 8:
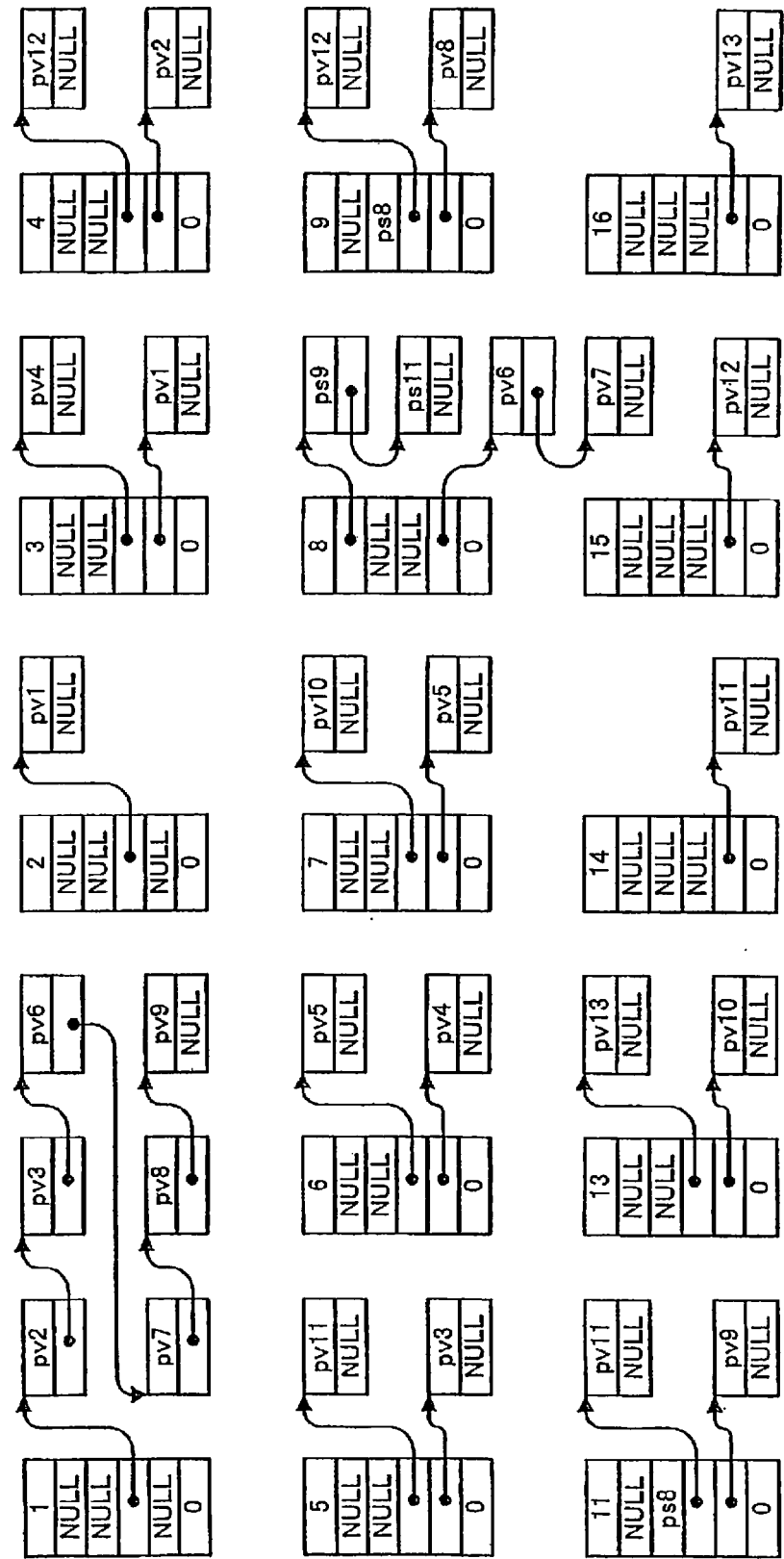
FIG. 8 shows an example of management of statement information in the first embodiment of the invention.
Figure 9:
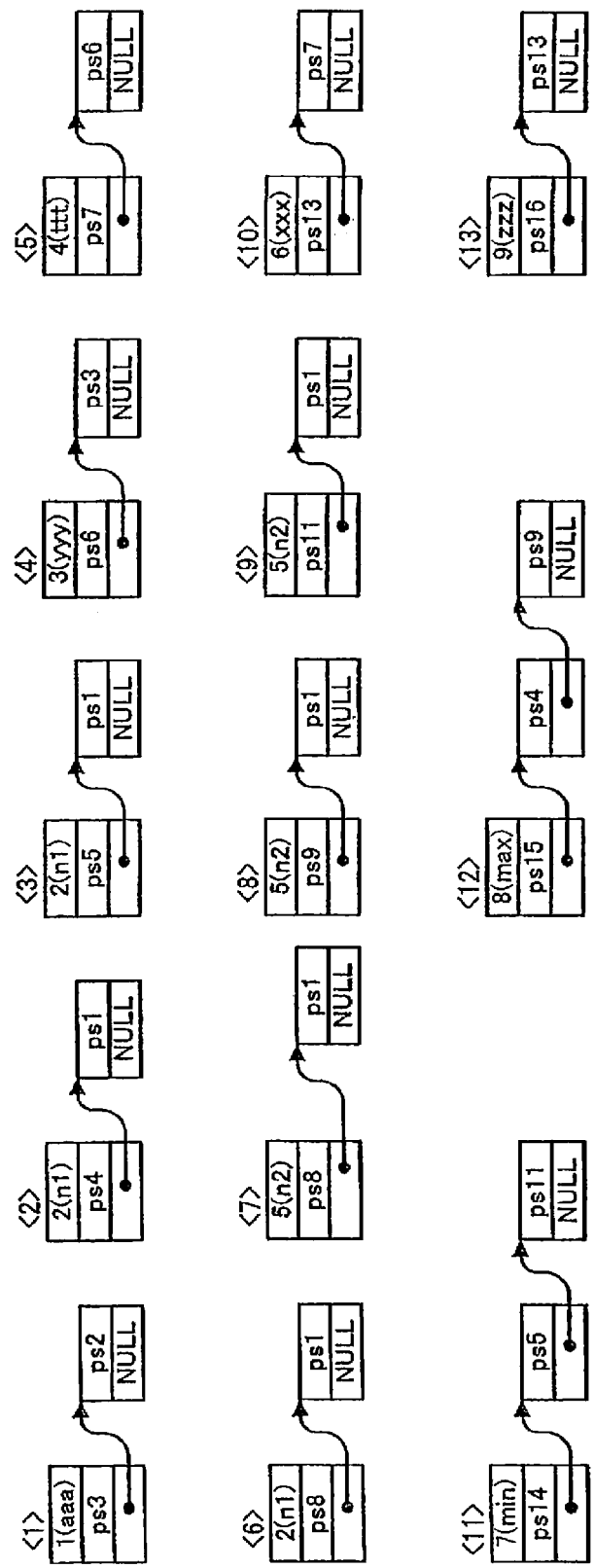
FIG. 9 shows an example of management of variable information in the first and second embodiments of the invention.

The following will describe specifically how to manage the PDG shown in FIG. 6 with data of the data structure shown in FIG. 7 with reference to FIGS. 8 and 9. FIG. 8 mainly shows data structures representing statements and FIG. 9 mainly shows data structures representing variables.

In FIG. 8, a data structure consisting of six fields is a data structure that represents a statement, and the fields are arranged in an order that corresponds with the order shown in FIG. 7(A). In FIG. 9, a data structure consisting of three fields is a data structure representing a variable, and the fields are arranged in an order that corresponds with the order shown in FIG. 7(B).

In the figures, a pointer is indicated by an arrow going to a data structure pointed by that pointer where it is possible in terms of drawing, however, where such drawing is difficult, a pointer is indicated by a symbol. "Psn" is a pointer to a data structure representing a statement, "n" indicating a statement ID. For example, "ps2" stored in the linear list that connects to the data structure of "1(*aaa*)" in FIG. 9 indicates a pointer to the data structure of statement 2 in FIG. 8. Also, "pvn" is a pointer to a data structure representing a variable, "n" indicating the address of the data structure. In FIG. 9, address "n" is denoted as <n>. For example, "pv1" stored in the linear list connecting to the data structure of statement 2 in FIG. 8 represents a pointer to the data structure of variable "1(*aaa*)" in FIG. 9.

In FIG. 8, dependence forward pointer lists and control dependence backward pointers are shown as "NULL" except for those relevant to the embodiment. If the source code shown in FIG. 2 were a portion of the source code of a larger program, analysis of the entire program would fill control dependence forward pointer lists and control dependence backward pointers, however, the embodiment denotes them as "NULL" for the sake of simplicity.

Further, FIG. 8 shows lists of only variables whose value is referenced in the statement as variable lists. Actually, variables to which values are assigned in the statement should also be described, however, such variables are omitted here since they are not subjected to processing in the embodiment.

Although variable IDs are denoted such as "1(*aaa*)" in FIG. 9, a variable ID is a numeral outside the parentheses and characters in the parentheses indicates a variable name (character string) that corresponds to the variable ID for convenience. This is because variable are normally identified by identification numbers within a computer and a correspondence table is provided separately that associates identification numbers with character strings for variable names.

Assuming that statements, variables and dependence between them are managed as shown in FIGS. 8 and 9, extraction of interface information at step 103 of FIG. 3 will be described in detail with reference to FIG. 10.

Figure 11:
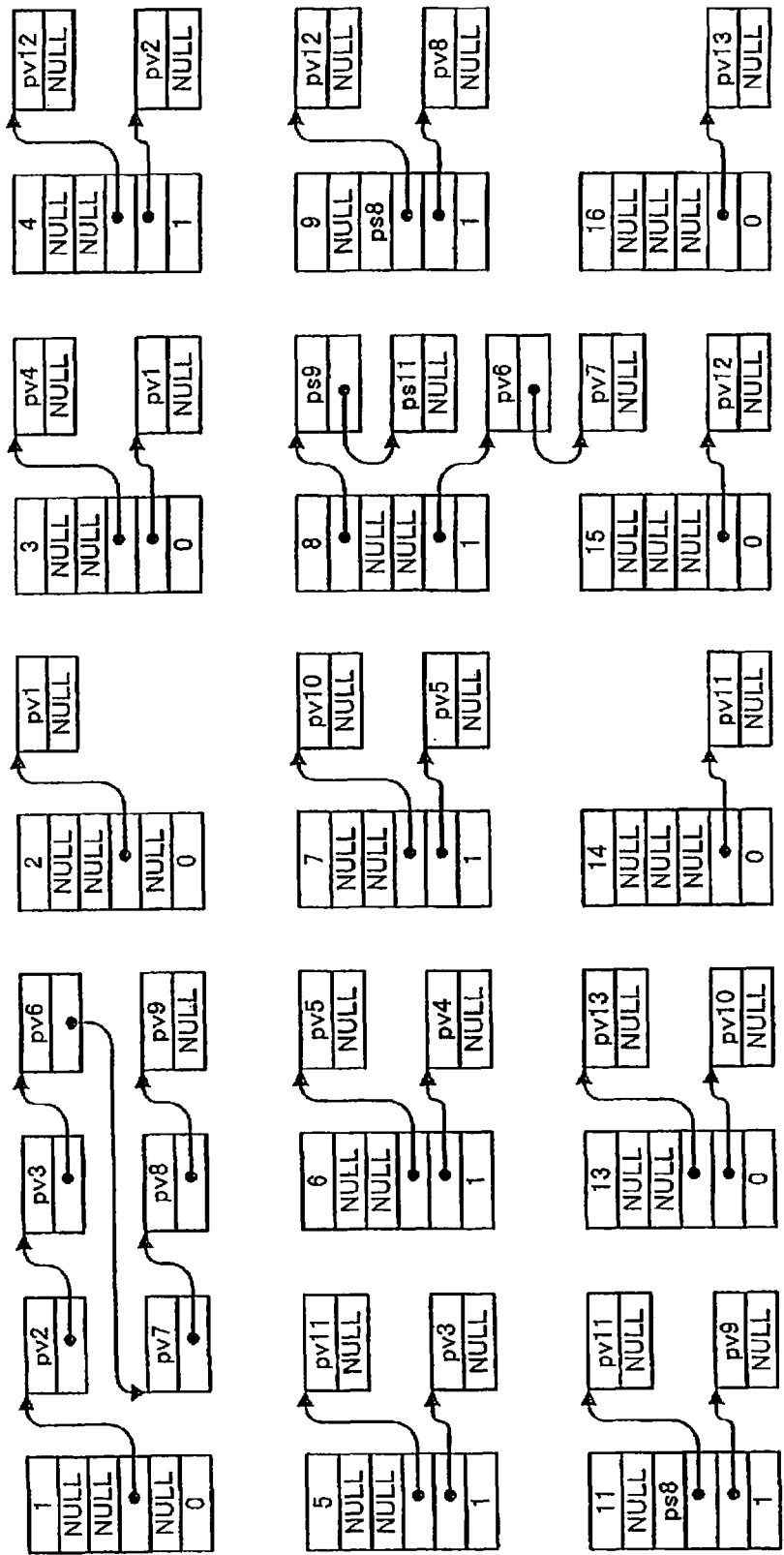
FIG. 11 shows an example of management of statement information in the first embodiment of the invention.

First, the dependence-information tracking unit 17 lists nodes of statements that are within a specified scope of a program fragment (step 121). For example, for each node in the scope of the program fragment, a list element is prepared that consists of a field for storing a pointer to the data structure representing the node and a field for storing a pointer to the next list element, and a linear list that connects such list elements is generated. If the program fragment shown in FIG. 2 is specified, a linear list is generated that stores pointers to data structures representing statements 4, 5, 6, 7, 8, 9, and 11. At the same time, the dependence-information tracking unit 17 sets information that indicates that the statement is within the scope of the program fragment for the in-scope flag for a data structure that represents a statement contained in the specified program fragment. In this example, content of data stored in the data structures representing the statements will be as shown in FIG. 11. That is, the in-scope flags for statements 4, 5, 6, 7, 8, 9, and 11 are set to "1".

In addition, the dependence-information tracking unit 17 sets a pointer that points a node that should be the target such that it points the first node in the linear list.

The dependence-information tracking unit 17 determines whether the pointer to the next node in the list element corresponding to the target node is "NULL" (step 122). If the pointer to the next node is "NULL", the processing returns to FIG. 3, however, if it is not "NULL", a variable name is added to the input/output variable list in respect to the node (step 123). Then, the pointer to the next node is followed and the pointer pointing a target node is updated to the next node (step 124), and the process returns to step 122. And operations at steps 123 and 124 are repeated until the pointer to the next node is "NULL", and when the pointer to the next node is "NULL", the process returns to FIG. 3.

Now, extraction of input/output variables at step 123 in FIG. 10 will be described in detail with reference to FIG. 12.

The dependence-information tracking unit 17 tracks incoming data dependence to the target node in the reverse direction and searches for node Nb (step 131). Then, it is determined whether Nb exists and the node is outside the program fragment scope (step 132). If Nb exists and is outside the scope, a variable name according to the dependence is added to the input variable list (step 133) and the process proceeds to step 134. In contrast, if the node does not exist or is not outside the scope, the process directly proceeds to step 134.

The dependence-information tracking unit 17 also follows outgoing data dependence from the target node in the forward direction and searches for node Nf (step 134). Then, it is determined whether Nf exists and the node is outside the program fragment scope (step 135). If the node exists and is outside the scope, a variable name according to the dependence is added to the output variable list (step 136) and the process returns to FIG. 10. On the other hand, if Nf does not exist or is not outside the scope, the process returns to FIG. 10.

The processing so far described will be specifically described. This description assumes that the program fragment shown in FIG. 2 has been specified and statements 4, 5, 6, 7, 8, 9, and 11 are listed in this order.

Figure 12:
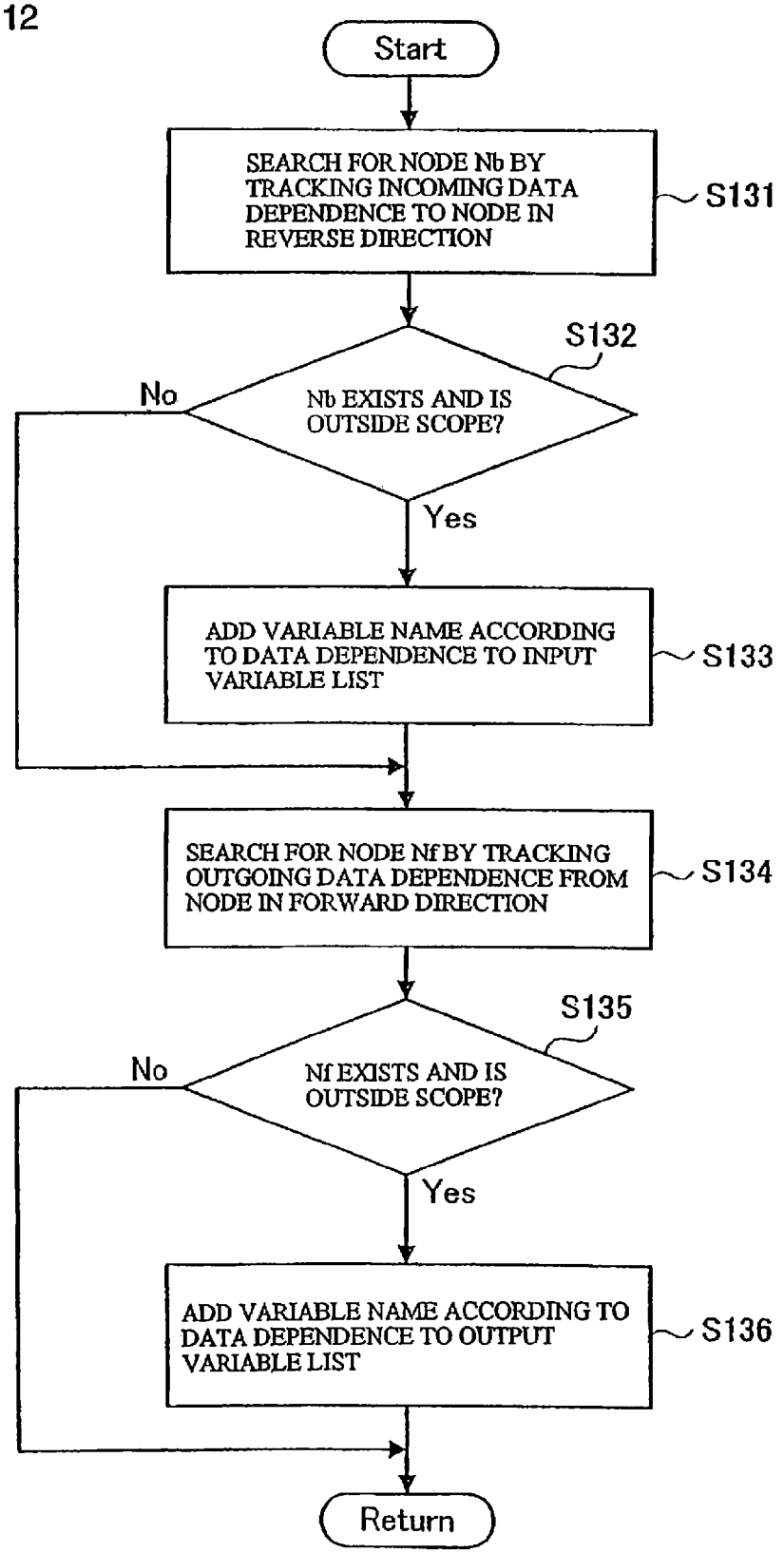
FIG. 12 is a flowchart showing the operation of interface information extraction in the first embodiment of the invention.

First, the processing shown in FIG. 12 is performed for statement 4 as the target. That is, in the data structure of statement 4, the variable list is referenced to obtain the data structure for variable "n1" from address "pv2". In that data structure, the data dependence backward pointer list is referenced to find statement 1 as node Nb. In the data structure of statement 1, reference to the in-scope flag shows "0", thus, determination at step 132 is "YES" and variable "n1" is added to the input variable list. Also, in the data structure of statement 4, the data dependence forward pointer list is referenced to obtain the data structure of variable "max" from address "pv12". In that data structure, the pointer to a statement is referenced to find statement 15 as node Nf. Reference to the in-scope flag in the data structure of statement 15 shows "0", thus, determination at step 135 is "YES" and variable "max" is added to the output variable list.

Then, the processing in FIG. 12 is performed for statement 5 as the target. That is, in the data structure of statement 5, the variable list is referenced to obtain the data structure for variable "n1" from address "pv3". In that data structure, the data dependence backward pointer list is referenced to find statement 1 as node Nb. Then, reference to the in-scope flag in the data structure of the statement 1 shows "0", thus, determination at step 132 is "YES" and variable "n1" is added to the input variable list. Also, in the data structure of statement 5, the data dependence forward pointer list is referenced to obtain the data structure for variable "min" from address "pv11". In that data structure, the pointer to a statement is referenced to find statement 14 as node Nf. Then, reference to the in-scope flag in the data structure of statement 14 shows "0", thus, determination at step 135 is "YES" and variable "min" is added to the output variable list.

Then, the processing shown in FIG. 12 is performed for statement 6 as the target. That is, in the data structure of statement 6, the variable list is referenced to obtain the data structure for variable "yyy" from address "pv4". In that data structure, the data dependence backward pointer list is referenced to find statement 3 as node Nb. Then, reference to the in-scope flag in the data structure of statement 3 shows "0", thus, determination at step 132 is "YES" and variable "yyy" is added to the input variable list. Also, in the data structure of statement 6, the data dependence forward pointer list is referenced to obtain the data structure for variable "ttt" from address "pv5". In that data structure, the pointer to a statement is referenced to find statement 7 as node Nf. Then, reference to the in-scope flag in the data structure of statement 7 shows "1", thus, determination at step 135 is "NO" and variable "ttt" is not added to the output variable list.

Then, the processing shown in FIG. 12 is performed for statement 7 as the target. That is, in the data structure of statement 7, the variable list is referenced to obtain the data structure for variable "ttt" from address "pv5". In that data structure, the data dependence backward pointer list is referenced to find statement 6 as node Nb. Reference to the in-scope flag in the data structure of statement 6 shows "1", thus, determination at step 132 is "NO" and variable "ttt" is not added to the input variable list. Also, in the data structure of statement 7, the data dependence forward pointer list is referenced to obtain the data structure for variable "xxx" from address "pv10". In that data structure, the pointer to a statement is referenced to find statement 13 as node Nf. And reference to the in-scope flag in the data structure of statement 13 shows "0", thus, determination at step 135 is "YES" and variable "xxx" is added to the output variable list.

Then, the processing of FIG. 12 is performed for statement 8 as the target. That is, in the data structure of statement 8, the variable list is referenced to obtain the data structure for variable "n1" from address "pv6" and the data structure for variable "n2" from address "pv7". In the data structure for variable "n1" at "pv6", the data dependence backward pointer list is referenced to find statement 1 as node Nb. Then, reference to the in-scope flag in the data structure of statement 1 shows "0", thus, determination at step 132 is "YES" and variable "nil" is added to the input variable list. Also, in the data structure for variable "n2" at "pv7", the data dependence backward pointer list is referenced to find statement 1 as node Nb. Then, reference to the in-scope flag in the data structure of statement 1 shows "0", thus, determination at step 132 is "YES" and variable "n2" is added to the input variable list. In the data structure of statement 8, node Nf is not found because the data dependence forward pointer list is "NULL", and thus determination at step 135 is "NO" and no output variable is extracted.

Then, the processing of FIG. 12 is performed for statement 9 as the target. That is, in the data structure of statement 9, the variable list is referenced to obtain the data structure for variable "n2" from address "pv8". In that data structure, the data dependence backward pointer list is referenced to find statement 1 as node Nb. Then, reference to the in-scope flag in the data structure of statement 1 shows "0", thus, determination at step 132 is "YES" and variable "n2" is added to the input variable list. Also, in the data structure of statement 9, the data dependence forward pointer list is referenced to obtain the data structure for variable "max" from address "pv12". In that data structure, the pointer to a statement is referenced to find statement 15 as node Nf. Then, reference to the in-scope flag in the data structure of statement 15 shows "0", thus, determination at step 135 is "YES" and variable "max" is added to the output variable list.

Then, the processing of FIG. 12 is performed for statement 11 as the target. That is, in the data structure of statement 11, the variable list is referenced to obtain the data structure for variable "n2" from address "pv9". In that data structure, the data dependence backward pointer list is referenced to find statement 1 as node Nb. Then, reference to the in-scope flag in the data structure of statement 1 shows "0", thus, determination at step 132 is "YES" and variable "n2" is added to the input variable list. Also, in the data structure of statement 11, the data dependence forward pointer list is referenced to obtain the data structure for variable "min" from address "pv11". In that data structure, the pointer to a statement is referenced to find statement 14 as node Nf. Then, reference to the in-scope flag in the data structure of statement 14 shows "0", thus, determination at step 135 is "YES" and variable "min" is added to the output variable list.

Figure 10:
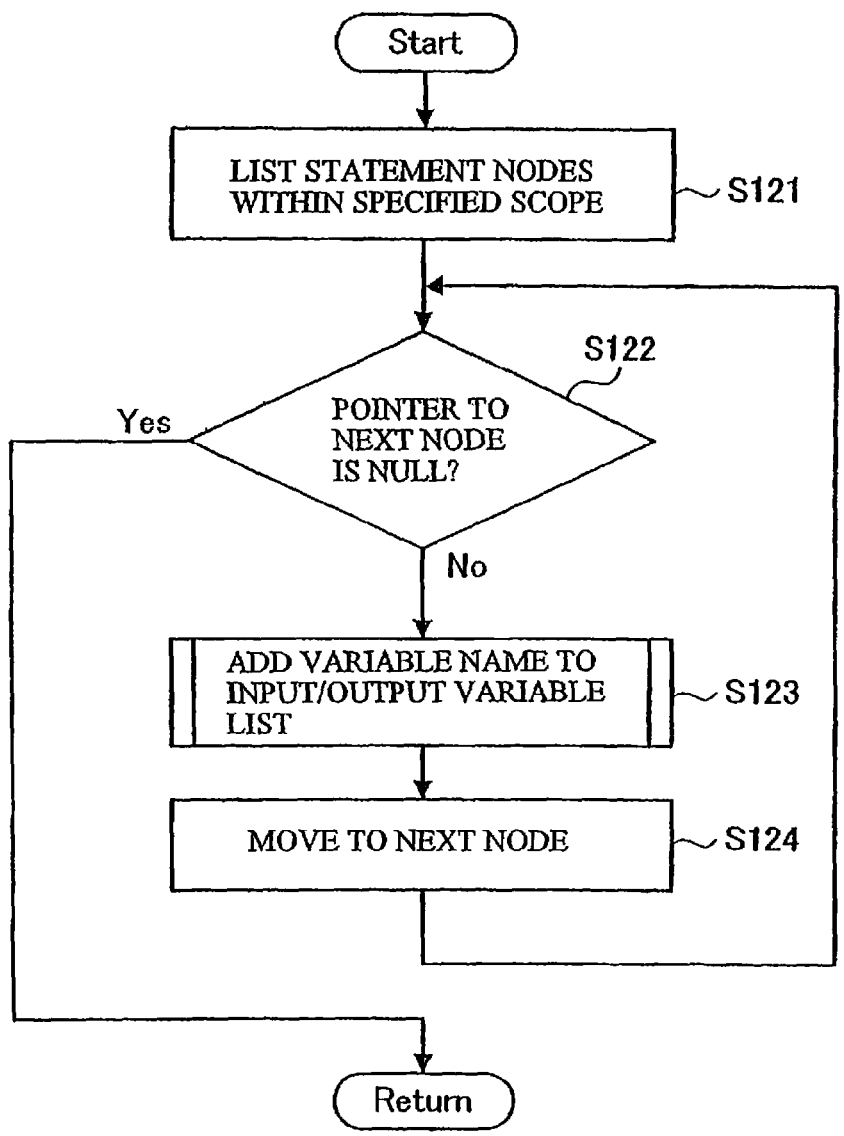
FIG. 10 is a flowchart showing the operation of interface information extraction in the first embodiment of the invention.

While the description above uses the in-scope flag to determine whether nodes Nb and Nf are within the program fragment, any other techniques may be employed as long as they can determine if a statement is within a program fragment, including tracking of the list generated at step 121 of FIG. 10, for example.

Although in the above example input/output variables are outputted whether the same input/output variables have been already outputted to the input/output variable list or not, it is also possible to check if the same input/output variable has already been outputted to the input/output variable list and not to output a variable again if it has already been outputted.

The embodiment allows interface information to be extracted from a specified program fragment through the processing above performed by the dependence-information tracking unit 17, which is implemented by a computer.

As has been described, the embodiment extracts interface information for a program fragment specified in a source code of a program based on a PDG. This facilitates understanding of interface information for a program fragment.

Second Embodiment

The second embodiment relates to a method for method extraction refactoring that utilizes the method for displaying interface information according to the first embodiment.

Figure 13:
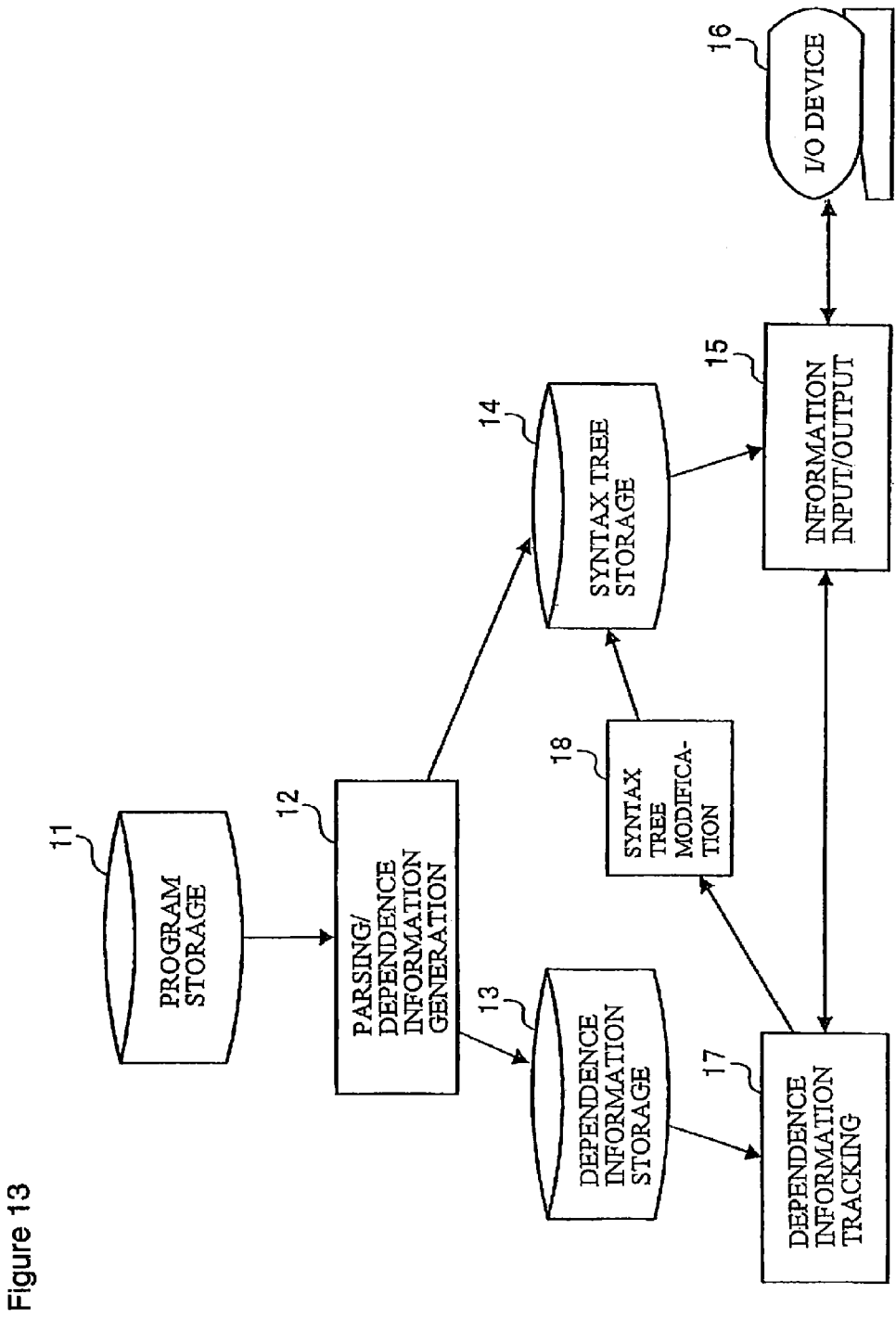
FIG. 13 is a block diagram showing the overall configuration of the second embodiment of the invention.

FIG. 13 is a block diagram showing the overall configuration of the second embodiment. As shown, the embodiment comprises a program storing unit 11, parsing/dependence-information generating unit 12, dependence information storing unit 13, syntax-tree storing unit 14, information input/output unit 15, input/output device 16, dependence-information tracking unit 17, and syntax tree modification unit 18.

The functions of the program storing unit 11, parsing/dependence-information generating unit 12, dependence information storing unit 13, syntax-tree storing unit 14, information input/output unit 15, input/output device 16, and dependence-information tracking unit 17 are the same as those in the first embodiment, however, the second embodiment further comprises the syntax tree modification unit 18.

The syntax tree modification unit 18 is for changing a syntax tree so that any computational portion of no interest (which can be known by not undergoing the tracking of dependence information) moves to outside an originally specified program fragment after tracking dependence information. This is required for realizing a user interface for method extraction refactoring.

The embodiment is implemented by a computer system. The hardware configuration of the computer system implementing the embodiment may be of a general type comprising a central processing unit (CPU), main memory, an auxiliary storage device such as a hard disk, input device, and output device.

The auxiliary storage device stores programs for implementing the parsing/dependence-information generating unit 12, information input/output unit 15, dependence-information tracking unit 17, and syntax tree modification unit 18, and these programs are read into the main memory and executed by the CPU so that the parsing/dependence-information generating unit 12, information input/output unit 15, dependence-information tracking unit 17, and syntax tree modification unit 18 are implemented. The auxiliary storage device also functions as the program storing unit 11, dependence information storing unit 13, and syntax-tree storing unit 14.

The operation of the embodiment will be now described in detail.

The description of this embodiment also assumes that the source code of a program shown in FIG. 2 is given. As examples of interface information for the program fragment, the embodiment also refers to input variables that are variables for storing a value given to a program fragment from external and output variables that are variables for storing a value to be given to external from the program fragment.

Figure 14:
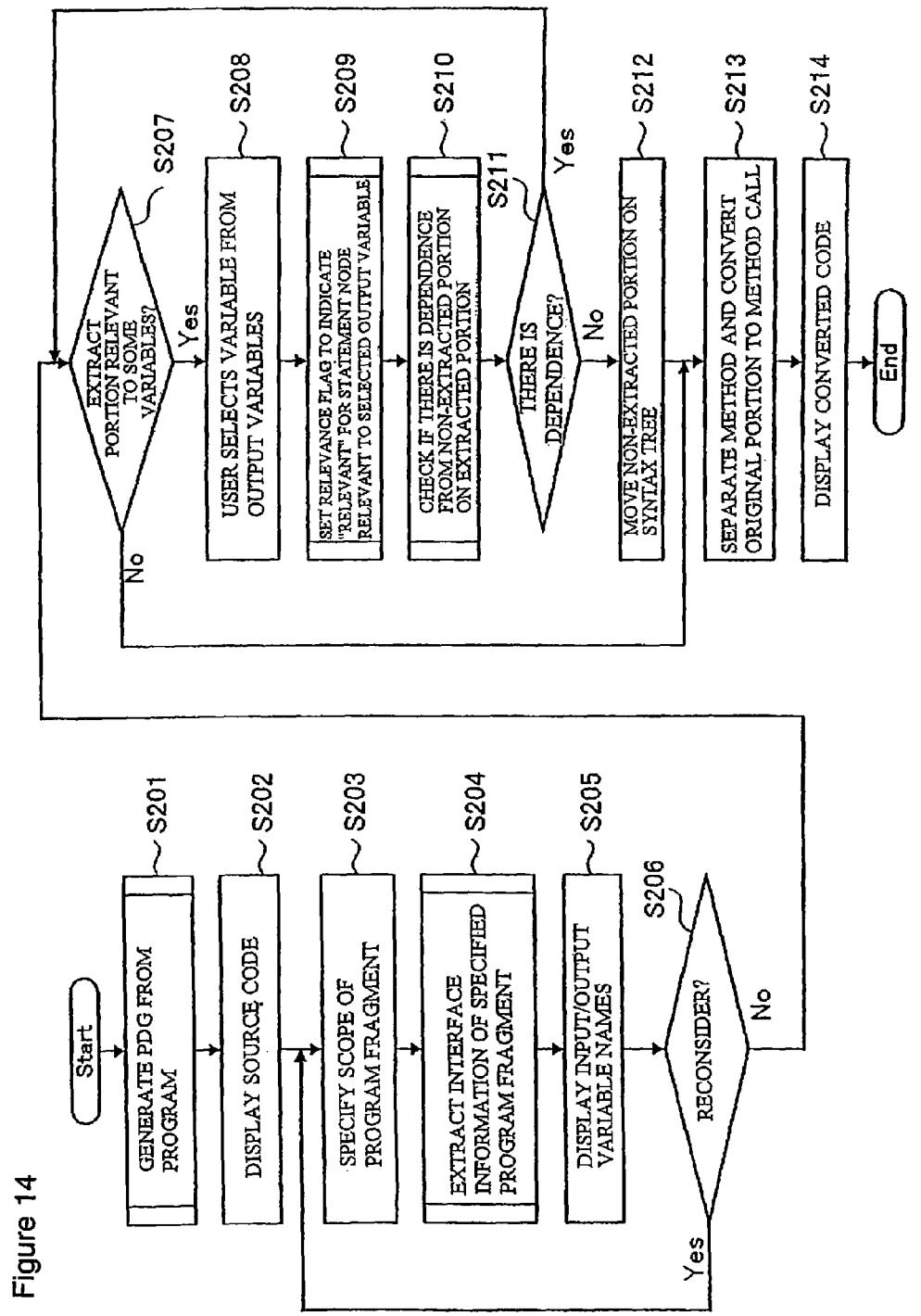
FIG. 14 is a flowchart showing the operation of the second embodiment of the invention.

FIG. 14 is a flowchart generally showing the operation of the embodiment.

The parsing/dependence-information generating unit 12 first reads the source code of a program stored in the program storing unit 11 and generates a PDG (step 201). The PDG is stored in the dependence information storing unit 13.

After generating the PDG, the source code is displayed by the information input/output unit 15 (step 202), and a scope of a program fragment is specified by the user (step 203). The specification is performed with an operation of indicating with a mouse a start statement and end statement of the program fragment for which the user wants to know interface information, for example.

The dependence-information tracking unit 17 then tracks the PDG stored in the dependence information storing unit 13 and extracts interface information of the specified program fragment (step 204).

After the interface information is extracted, the information input/output unit 15 receives it from the dependence-information tracking unit 17 and displays it on the input/output device 16 (step 205). Assuming that the scope indicated by the broken line is specified as a program fragment in the source code shown in FIG. 2, the interface information for the program fragment will be displayed as shown in FIG. 4, for example.

At this point, the user is given an opportunity to reconsider if the interface information is appropriate (step 206). If the interface information is not satisfactory to the user and the user wants to change the scope of the program fragment, the user will return to step 203 to specify a scope again. In this way, the user specifies the scope while checking the interface information for the program fragment, thus, a method that is closer to the user's intention can be extracted.

The generation of the PDG at step 201 in FIG. 14 is almost identical to that at step 101 of FIG. 3. The PDG generated here is the same as that shown in FIG. 6 at the level of schematic diagram, however, the embodiments adds a relevance flag to the data structure representing a statement shown in FIG. 7(A). A relevance flag is a flag that indicates, if the user selects some of output variables, whether the statement is relevant to determination of the value to be stored in the selected variables. The relevance flag is set to "0" as the initial value, for example, and is set to "1" if the statement is relevant to the selected variable, although any other techniques may be employed as long as they can indicate if a statement is relevant to a selected variable.

Unlike the first embodiment, the embodiment also can separate only a portion that is relevant to some of output variables as a method in a program fragment that has been originally specified. In FIG. 14, steps 207 to 214 correspond to this processing.

The user is first given an opportunity to determine whether to extract only a portion relevant to some of output variables as a method (step 207). If the user does not want to perform such extraction, the process proceeds to step 213, however, if the user wants to, the user selects a variable from among output variables (step 208). The dependence-information tracking unit 17 sets the relevance flag for a data structure that represents a statement relevant to the selected output variable (hereinafter referred to as "selected output variable") to a value that indicates that the statement is relevant to the selected output variable (step 209). Then, it is checked whether there is any dependence of a portion that consists of statements for which such a value is not set for the relevance flag (hereinafter referred to as "non-extracted portion") on a portion that consists of statements for which the relevance flag is set to such a value (hereinafter "extracted portion") (step 210). If it is determined that is there is dependence (YES at step 211), the process returns to step 207, however, if not (NO at step 211), the portions are separated from each other such as moving the non-extracted portion to below the extracted portion (step 212).

For example, assume that output variables "xxx", "max", and "min" are displayed at step 205 as in the first embodiment. However, the user wants to extract as a method a processing portion in which the values of the output variables "max" and "min" are determined. That is, the user does not want to have the portion for calculating the value of the output variable "xxx" contained in the method. In such a case, the user selects "max" and "min" as output variables for the program fragment that he/she requires. Then, at step 212, the portion in which the output variable "xxx" is calculated from the input variable "yyy" in which the user is not interested (non-extracted portion) is separated from the portion of the user's interest (extracted portion), resulting in the display shown in FIG. 15. In this example, "ttt:=yyy/2;" and "xxx:= ttt;" have been moved. The user confirms that input variables are "n1" and "n2" and output variables are "max" and "min" in FIG. 15 before starting method extraction. This causes the dependence-information tracking unit 17 to separate the method and converts the original place into a method call (step 213) and displays a converted source code (step 214).

Figure 16:
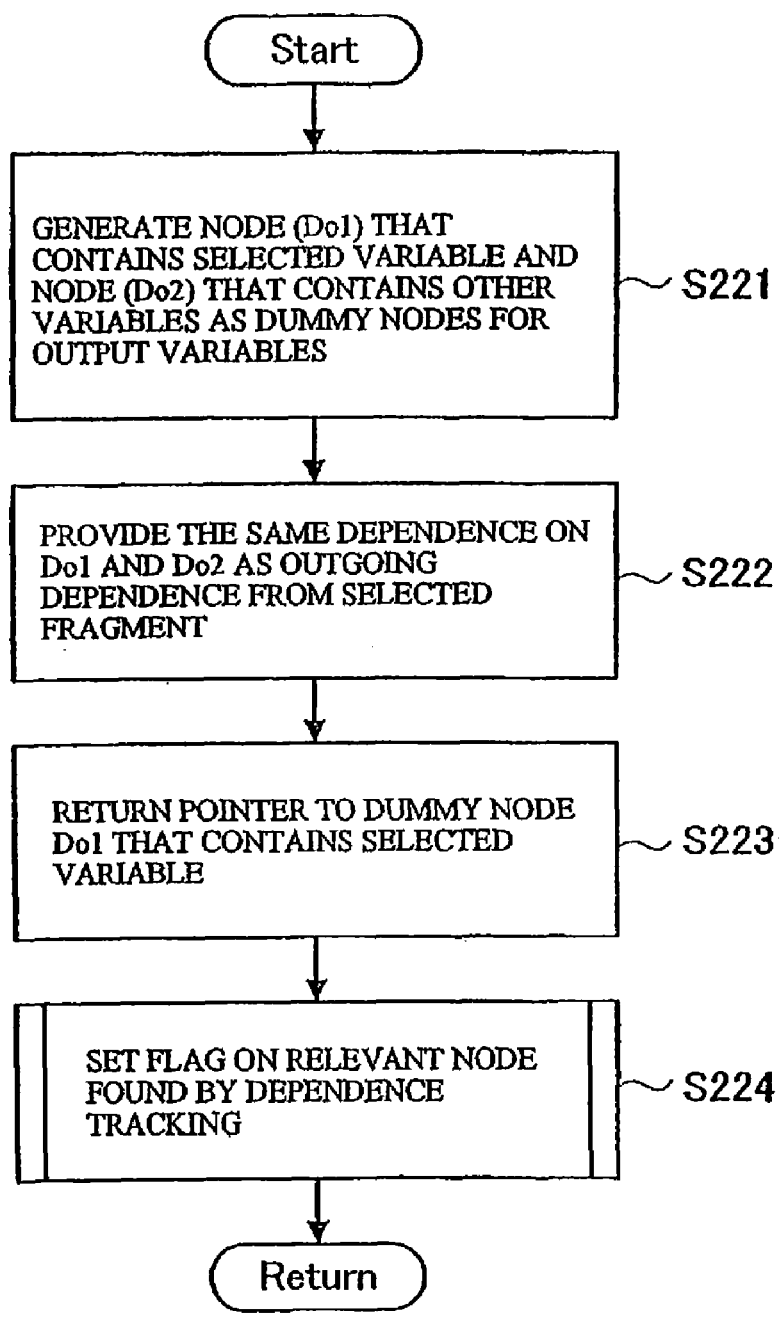
FIG. 16 is a flowchart showing the operation of relevance flag setting in the second embodiment of the invention.

The setting of the relevance flag at step 209 in FIG. 14 will be now described in detail with reference to FIG. 16.

First, the dependence-information tracking unit 17 generates node "Do1" that contains selected output variables and node "Do2" that contains other output variables as dummy nodes for output variables (step 221).

The dependence-information tracking unit 17 then provides on those dummy nodes "Do1" and "Do2" the same data dependence as outgoing dependence from the specified program fragment to external (step 222).

Then, it returns a pointer to the dummy node "Do1" that contains the selected output variable (step 223).

The dependence-information tracking unit 17 further performs dependence tracking and sets information indicating "relevant" for the relevance flag of nodes relevant to the selected variable (step 224).

Figure 17:
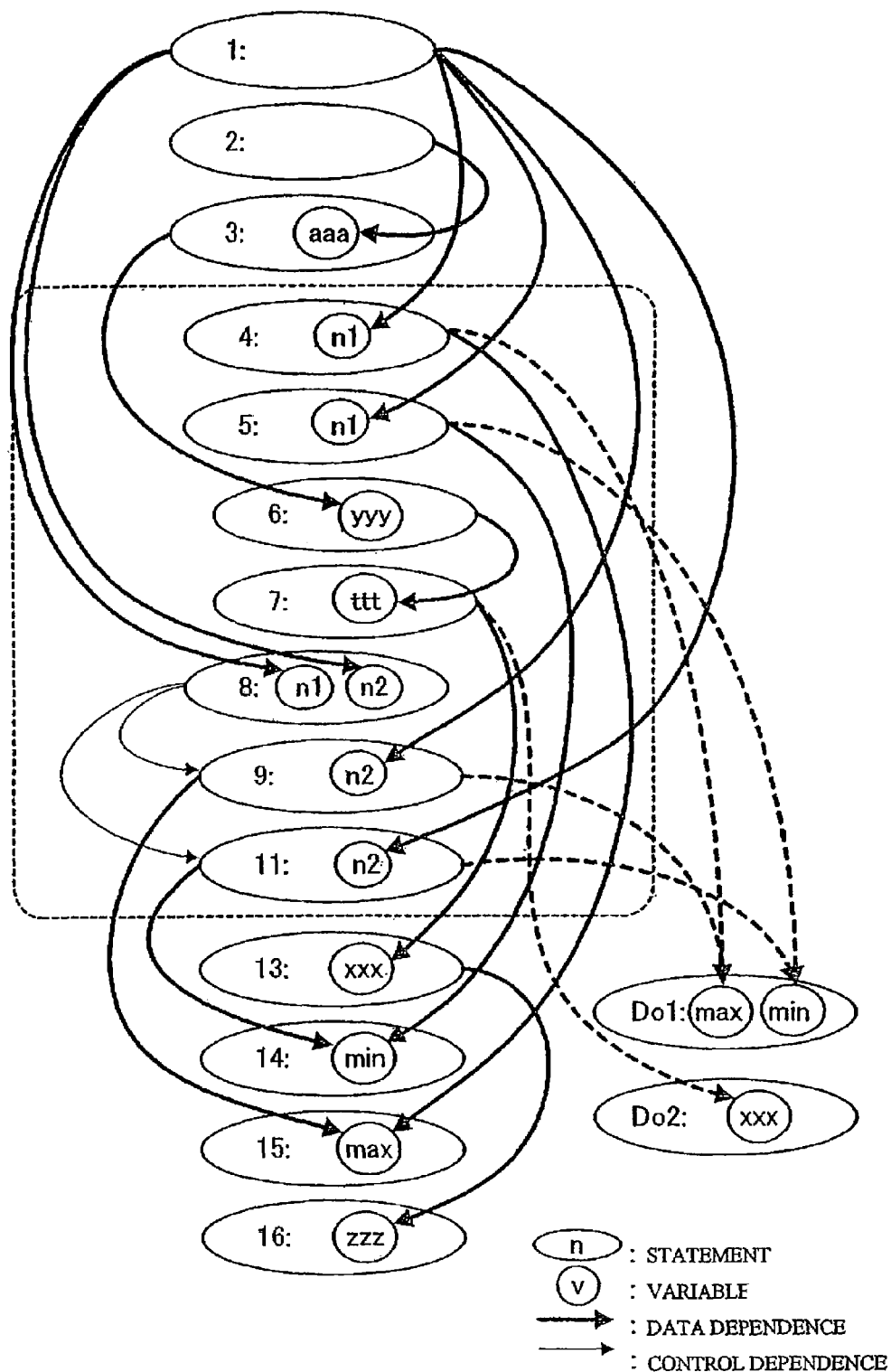
FIG. 17 shows a PDG for use in description of the second embodiment of the invention.

FIG. 17 schematically shows a PDG that includes the dummy nodes "Do1" and "Do2". As shown, variable "max" contained in the dummy node "Do1" for output variables is given the same data dependence as the variable "max" contained in statement 15, and the variable "min" contained in the dummy node "Do1" for output variables is given the same data dependence as the variable "min" contained in statement 14. The variable "xxx" contained in the dummy node "Do2" for output variables is given the same data dependence as the variable "xxx" contained in statement 13.

In the following, an example of how to manage the dummy nodes "Do1" and "Do2" contained in the PDG of FIG. 17 within a computer will be specifically described.

Figure 18:
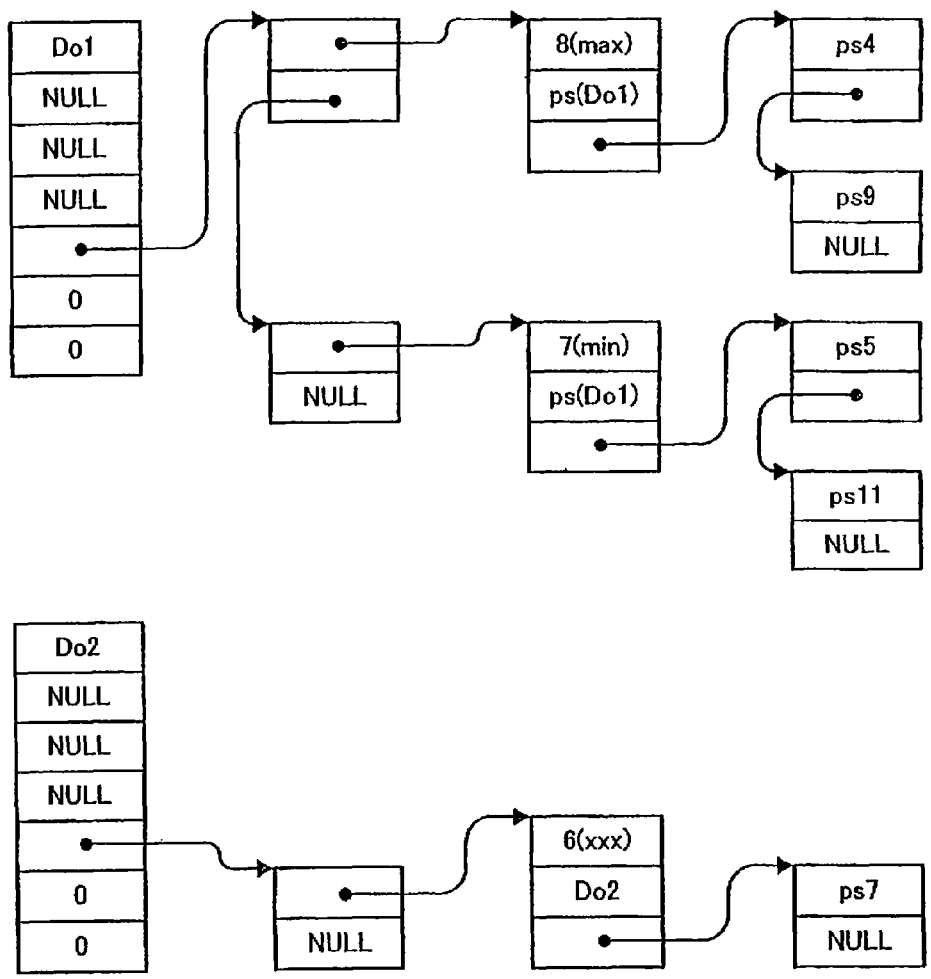
FIG. 18 shows an example of management of dummy node information in the second embodiment of the invention.

The dummy nodes "Do1" and "Do2" shown in FIG. 17 are managed with a data having the data structure shown in FIG. 18, for example. The data structure representing a statement in this embodiment has a structure of the data structure shown in FIG. 7(A) with a "relevance flag" added, and the data structure representing the dummy node thus has a corresponding data structure.

Figure 19:
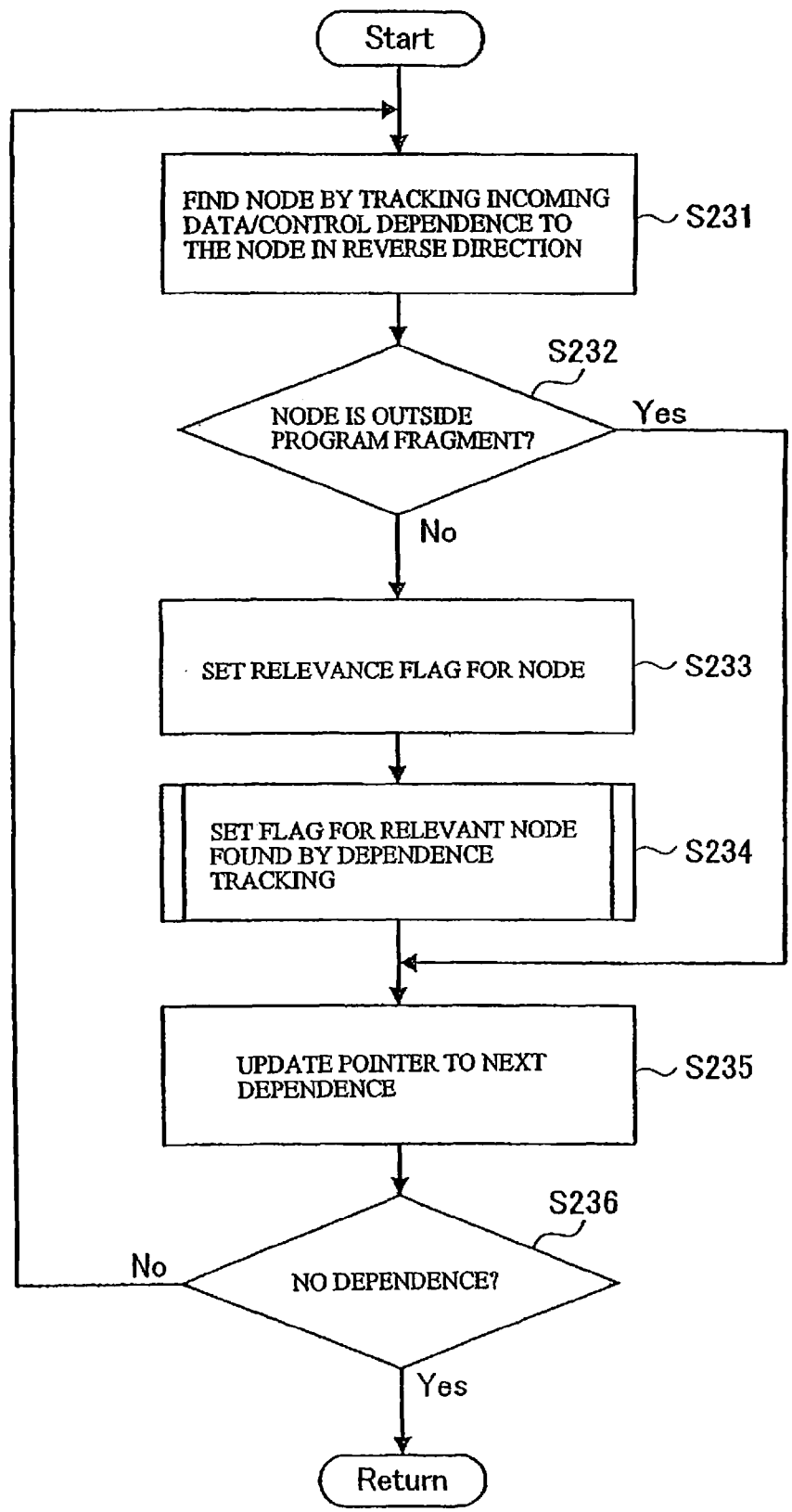
FIG. 19 is a flowchart showing the operation of relevance flag setting in the second embodiment of the invention.

The processing at step 224 in FIG. 16 will be now described in detail with reference to FIG. 19.

The dependence-information tracking unit 17 first picks out one of incoming data/control dependences of the target node and tracks the dependence in the reverse direction to find a node (step 231). Note that not only data dependence but control dependence is tracked here.

After finding the node, the dependence-information tracking unit 17 determines whether the node is outside the specified program fragment (step 232), and if it is, the process proceeds to step 235. On the other hand, if the node is not outside the scope, information indicating that the node is relevant for the relevance flag of the node (step 233) and recursively calls the processing shown in FIG. 19 for the node (step 234).

Upon completing these operations, the dependence-information tracking unit 17 updates the pointer indicating a target dependence to the next dependence (step 235). If there is still any dependence to be processed (NO at step 236), the process proceeds to step 231, and if not (YES at step 236), the process returns to FIG. 16.

The operations mentioned above will be described specifically. Assume that the dummy nodes "Do1" and "Do2" in the PDG shown in FIG. 17 are managed in the manner shown in FIG. 18, and other portions are managed in the manner illustrated in FIGS. 8 and 9. However, it is assumed that a field for storing a relevance flag has been added to the data structures of statements in FIG. 8.

First, in the data structure of the dummy node "Do1", the variable list is referenced to obtain the data structures of variables "max" and "min". Then, in the data structure of variable "max", the data dependence backward pointer list is referenced to find statements 4 and 9. Also, in the data structure of variable "min", the data dependence backward pointer list is referenced to find statements 5 and 11. Because the control dependence backward pointer is "NULL" in the data structure of dummy node "Do1", no node is found by tracking control dependence.

Thus, processing at steps 232 to 234 will be performed for the statements 4, 9, 5, and 11.

First, in the data structure of statement 4, reference to the in-scope flag shows "1", thus, determination at step 232 is "NO" and the relevance flag for statement 4 is set to "relevant".

Then, in the data structure of statement 4, the variable list is referenced to obtain the data structure for variable "n1" from address "pv2". In that data structure, the data dependence backward pointer list is referenced to find statement 1. Then, reference to the in-scope flag shows "0" in the data structure of statement 1, thus, determination at step 232 is "YES" and the relevance flag is not updated. Because the control dependence backward pointer is "NULL" in the data structure of statement 4, no node is found by tracking control dependence.

Also, reference to the in-scope flag in the data structure of statement 9 shows "1", thus, determination at step 232 is "NO" and the relevance flag for statement 9 is set to "relevant".

Then, the variable list in the data structure of statement 9 is referenced to obtain the data structure of variable "n2" from address "pv8". In that data structure, the data dependence backward pointer list is referenced to find statement 1. Then, reference to the in-scope flag in the data structure of statement 1 shows "0", thus, determination at step 232 is "YES" and the relevance flag is not updated. Also, in the data structure of statement 9, the control dependence backward pointer list is referenced to find statement 8. Then, reference to the in-scope flag in the data structure of statement 8 shows "1", thus, determination at step 232 is "NO" and the relevance flag is set to "relevant".

Further, reference to the in-scope flag in the data structure of statement 5 shows "1", thus, determination at step 232 is "NO" and the relevance flag for statement 5 is set to "relevant".

Then, in the data structure of statement 5, the variable list is referenced to obtain the data structure of variable "n1" from address "pv3". In that data structure, the data dependence backward pointer list is referenced to find statement 1. Reference to the in-scope flag in the data structure of statement 1 shows "0", thus, determination at step 232 is "YES" and the relevance flag is not updated. Because the control dependence backward pointer is "NULL" in the data structure of statement 5, no node is found by tracking control dependence.

Then, in the data structure of statement 11, the variable list is referenced to obtain the data structure of variable "n2" from address "pv9". In that data structure, the data dependence backward pointer list is referenced to find statement 1. Then, reference to the in-scope flag in the data structure of statement 1 shows "0", thus, determination at step 232 is "YES" and the relevance flag is not updated. Also, in the data structure of statement 11, the control dependence backward pointer is referenced to find statement 8. Reference to the in-scope flag in the data structure of statement 8 shows "1", thus, determination at step 232 is "NO" and the relevance flag is set to "relevant".

Figure 20:
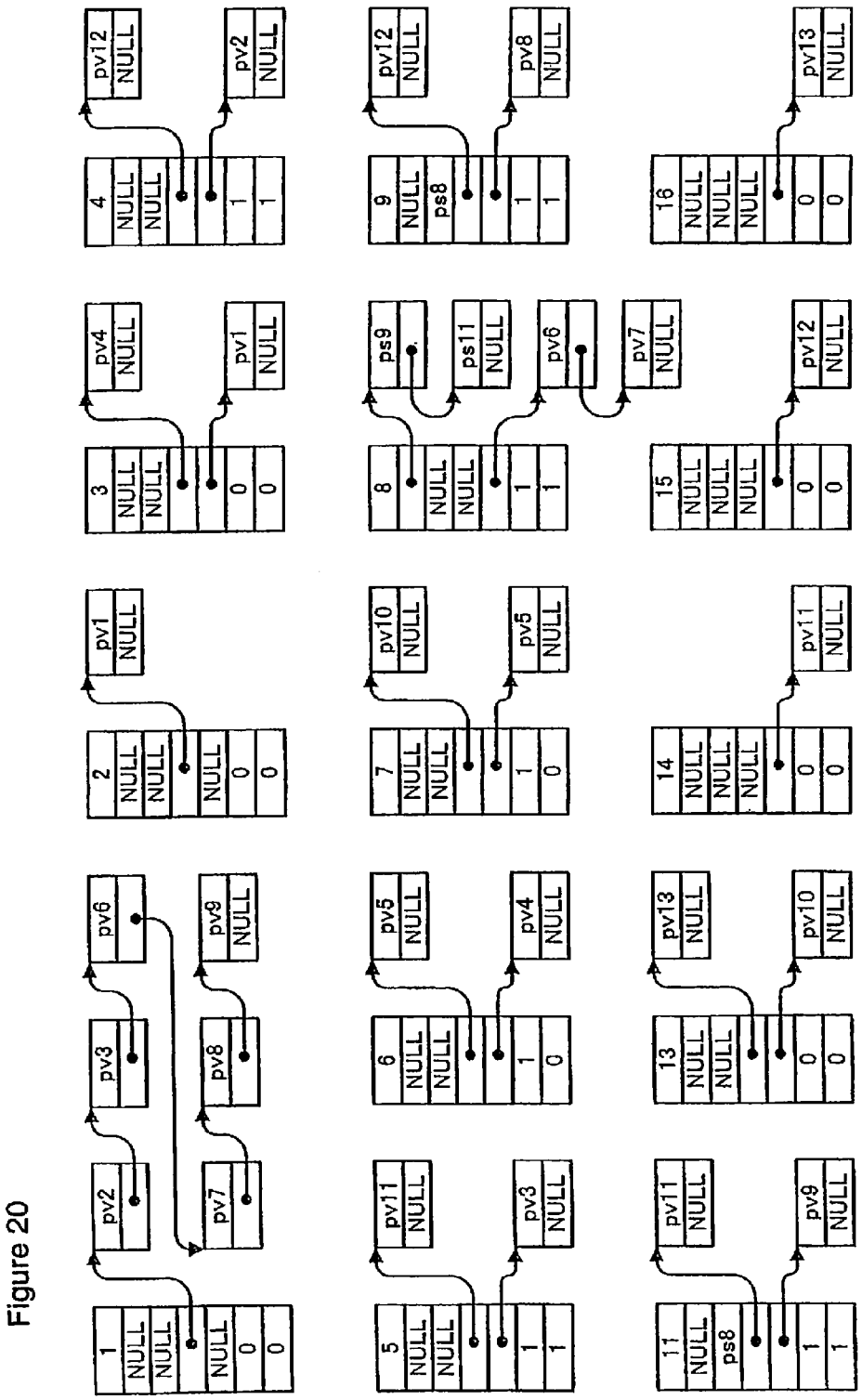
FIG. 20 shows an example of management of statement information in the second embodiment of the invention.

As a result of the processing described above, the data structure representing the PDG shown in FIG. 17 is as shown in FIG. 20. That is, among statements 4, 5, 6, 7, 8, 9, and 11 for which the in-scope flag is set to "1", the relevance flags for the statements 4, 5, 8, 9, and 11 are set to "1".

Figure 21:
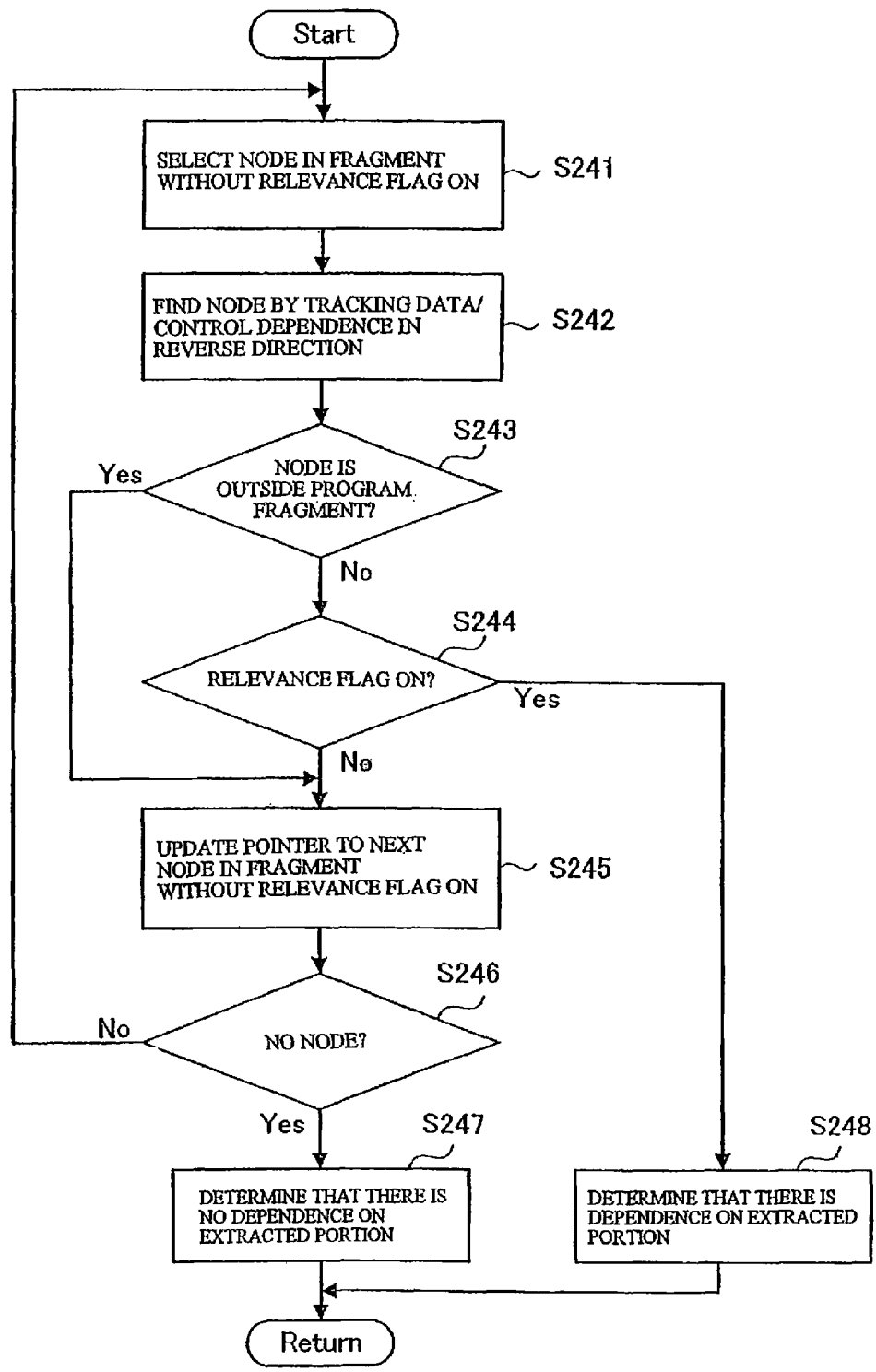
FIG. 21 is a flowchart showing the operation of dependence examination in the second embodiment of the invention.

Examination of dependence at step 210 of FIG. 14 will be now described in detail with reference to FIG. 21.

It is possible to extract an extracted portion as a method even though there is dependence of a portion that has been determined not to be relevant to the selected output variable (non-extracted portion) on the portion that has been determined to be relevant to the selected output variable (extracted portion). In such a case, however, it would be necessary to leave some statements contained in the extracted portion separated as a method also in the original source code.

Assume for example that statement 7 in the source code shown in FIG. 2 is "xxx:=ttt+max;". In this situation, if "max" and "min" are selected from output variables, the relevance flag of statement 7 will not be updated according to the flowchart in FIG. 19. Therefore, "xxx:=ttt+max;" of statement 7 would remain in the original source code when the extracted portion is separated as a method, however, "max:=n1;" that is contained in the separated method has to be described in the original source code redundantly since the value of variable "max" has not been determined.

As a result, if the redundant portion needs to be modified, the redundant portion in both of the method and the source code would have to be modified. In that process, modification of either one might be forgotten, reducing the maintainability of a program after method extraction refactoring.

The invention thus does not perform method extraction for a portion that is relevant to a selected output variable when there is dependence of the non-extracted portion to the extracted portion.

The dependence-information tracking unit 17 selects a node within the program fragment for which the relevance flag is not set to a value indicating "relevant" (step 241), and tracks data/control dependence in the reverse direction to find a node (step 242). Then, it determines whether the node is outside the program fragment (step 243), and if it is determined the node is not outside the program fragment, it is determined whether the relevance flag of the node is set to a value indicating that the node is relevant (step 244). If it is determined that the relevance flag is set to a value indicating relevance, it is determined that there is dependence on the extracted portion (step 248).

Meanwhile, if it is determined at step 243 that the node is outside the program fragment or if it is determined at step 244 that the relevance flag is not set to a value indicating "relevant", the process proceeds to the next node for which the relevance flag is not set to a value indicating "relevant" (step 245). If there is still any node (NO at step 246), the process proceeds to step 241, however, if not (YES at step 246), it is determined that there is no dependence on the extracted portion (step 247).

In such a manner, it is determined if there is any dependence of non-extracted portion on the extracted portion, and if there is such dependence, another output variable is selected again or selection of output variables is stopped and the program fragment originally specified is separated as a method.

If there is no dependence, non-extracted portion will be separated from the extracted portion; however, in such a case the syntax tree modification unit 18 modifies a syntax tree stored in the syntax-tree storing unit 14 so that it conforms to the structure of the source code after the separation.

Figure 15:
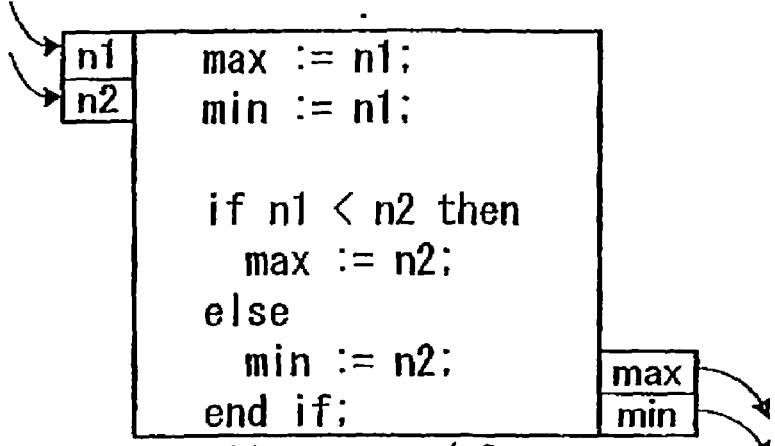
FIG. 15 shows an output result in the second embodiment of the invention.
Figure 22:
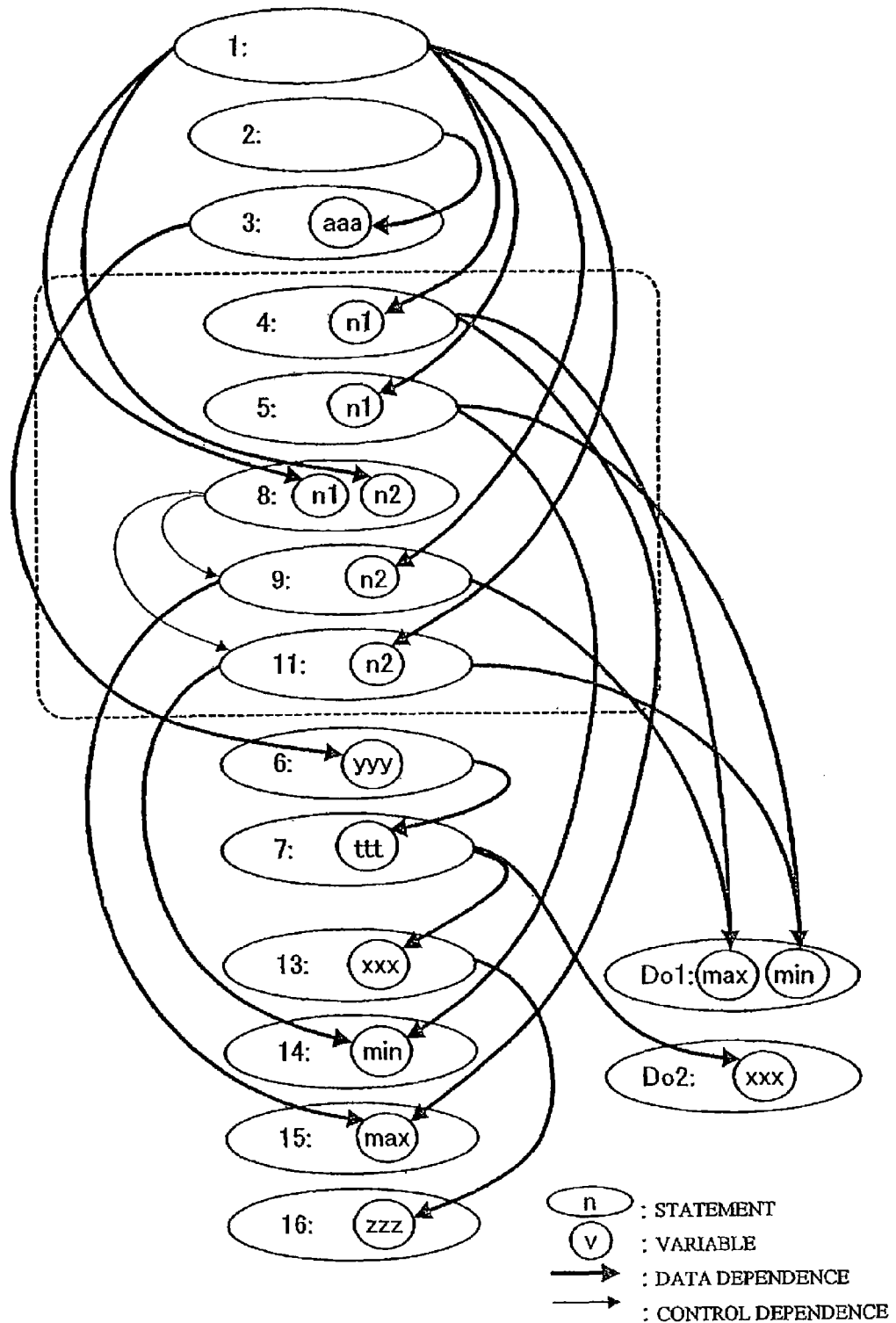
FIG. 22 shows a PDG for use in description of the second embodiment of the invention.

A PDG that corresponds to the display in FIG. 15 is shown in FIG. 22. However, the relation between nodes and arcs in FIG. 22 is identical to FIG. 17 and it is not intended to mean that content of data relating to managed statements and variables substantially differ in FIG. 17 and FIG. 22.

Following the processing described above, a method is extracted. While a method to be extracted is typically a extracted portion in which the user has interest, a non-extracted portion may be extracted as a method. FIG. 23 shows how to extract a method. FIG. 23(A) is for a case where input/output variables are not parameterized in a method, whereas FIG. 23(B) is for a case where input/output variables are parameterized in a method. In object-oriented languages, in many cases method calls are performed without parameterization because a variable scope for an instance variable is limited by a scope known as "class" and methods are often defined so that they access instance variables.

In procedural languages such as Pascal family languages, C, and PL/I, method calls are desirably performed with parameterization partly because such languages do not have variable scopes defined by classes. In Pascal family languages, it is necessary to specify input variables by call-by-value and output variables by call-by-reference. In the definition of parameters of "procedure max_min" in FIG. 23(B), call-by-reference is specified since "var" option is added to parameter variables max and min. This causes values assigned to variables max and min in this method are reflected as change to actual arguments for the method call. In PL/I, no specification equivalent to "var" in this case is particularly required since method calls are performed by call-by-reference. In C language, because the language has only call-by-value, a counterpart of an output variable need to be extracted by modifying it such that a pointer (address) to the variable is passed as a parameter and the area pointed by the pointer is assigned with data in the method and the pointer is returned.

Figure 24:
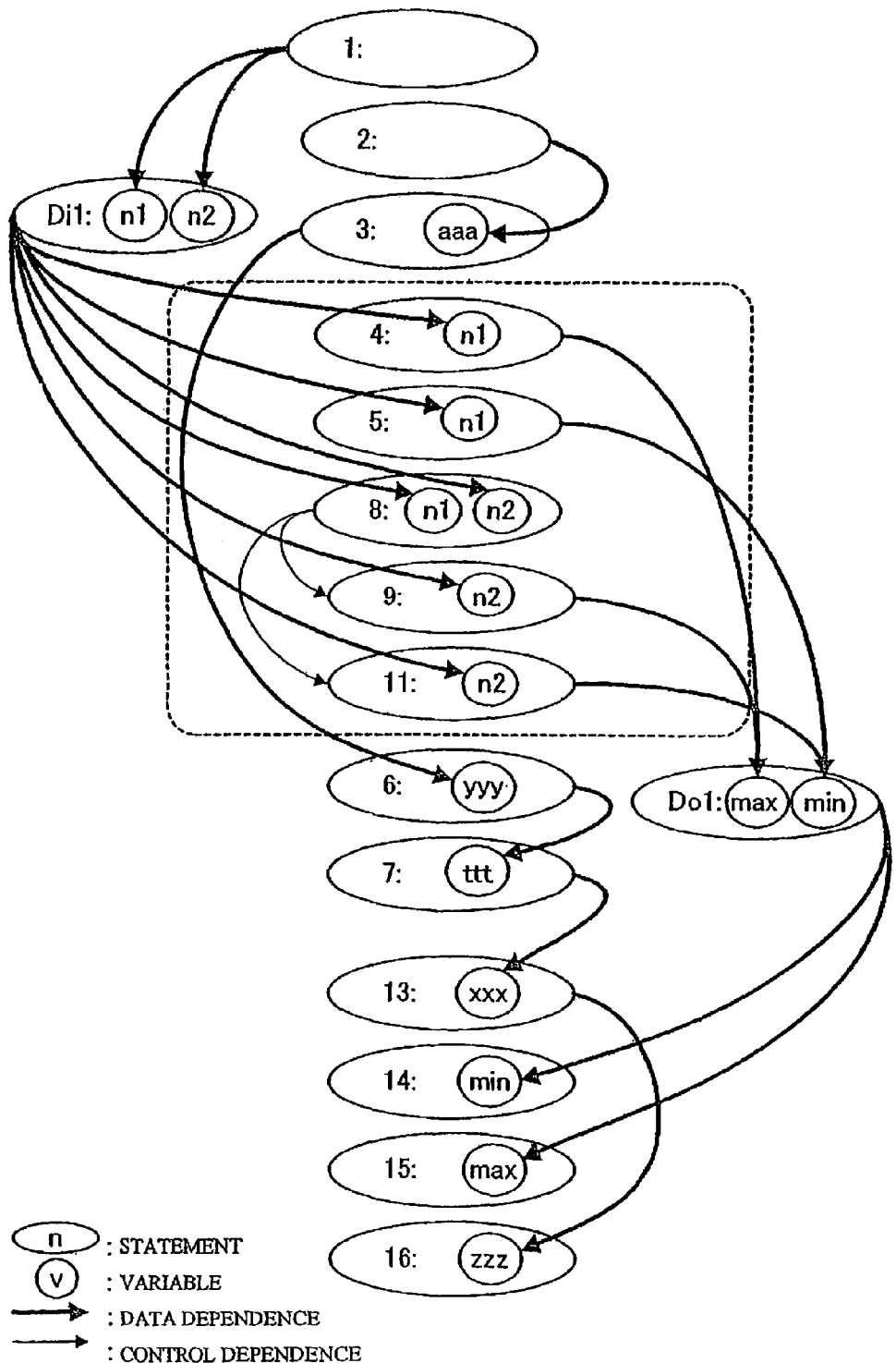
FIG. 24 shows a PDG for use in description of the second embodiment of the invention.

FIG. 24 schematically shows a PDG for a case where input/output variables are parameterized. Dummy node "Di1" for input variables that contains input variables "n1" and "n2" and dummy node "Do1" for output variables that contains output variables "max" and "min" are prepared, and data dependence is newly provided such that input/output to/from a fragment to be extracted as a method once goes through those nodes/variables. In the dummy nodes "Di1" and "Do1", values that have been set upstream from them are referenced by variables in those dummy nodes, and at the same time, they set those values of variables as they are (without changing them). Method extraction can be performed with variables in "Di1" as input variables and variables in "Do1" as output variables in FIG. 24. Those dummy nodes correspond to dummy arguments for input/output in a method and actual arguments for input/output in calling the method.

In this manner, the embodiment selects a particular piece of interface information from interface information for a program fragment, thereby extracting only a portion from the program fragment that is relevant to the selected interface information. This enables refactoring and the like in consideration of interface information for the program fragment, allowing efficient program maintenance.

ADVANTAGES OF THE INVENTION

The invention thus facilitates understanding of interface information for a program fragment and enables efficient program maintenance such as refactoring.

What is claimed is:

1. A program maintenance supporting method comprising the steps of:
   generating information on data dependence between statements and variables in a program and storing the information on data dependence in storing means;
   accepting specifying-information specifying a scope of a specific program fragment of said program, said specific program fragment being a set of one or more sequential statements of said program, said program fragment containing fewer than all statements of said program;
   responsive to accepting specifying-information specifying a specific program fragment of said program, extracting interface information on an interface of said specific program fragment using said information on data dependence stored in said storing means, wherein said step of extracting interface information extracts as said interface information (a) all input variables of said specific program fragment, each said input variable being a variable which is referenced by at least one respective statement within the scope of said specific program fragment and a value of which is determined by at least one statement not within the scope of said specific program fragment, and (b) all output variables of said specific program fragment, each said output variable being a variable which is referenced by at least one statement not within the scope of said specific program fragment and a value of which is determined by at least one statement within the scope of said specific program fragment; and
   outputting said extracted interface information.

2. The program maintenance supporting method according to claim 1, said step of extracting interface information comprising steps of:
   identifying a first set of statements that consists of statements that determine the value of variables contained in said program fragment;
   determining whether each statement of said identified first set of statements is contained in said program fragment;
   extracting said variables as said input variables if it is determined that any one of said first set of statements is not contained in said program fragment;
   identifying a second set of statements that consists of statements that use the value of variables contained in said program fragment;
   determining whether each statement of said identified second set of statements is contained in said program fragment; and
   extracting said variables as output variables if it is determined that any one of said second set of statements is not contained in said program fragment.

3. The program maintenance supporting method according to claim 2, wherein said step of extracting interface information further comprises a step of adding an in-scope flag indicating whether a statement is contained in said program fragment to the information for a statement contained in said program fragment and storing the information in said storing means, wherein
   said step of determination for said first statements and said step of determination for second statements determine if a given statement is contained in said program fragment by means of said in-scope flag added to the information for the statement.

4. The program maintenance supporting method according to claim 1, said outputting step outputs said extracted input variables and output variables.

5. The program maintenance supporting method according to claim 1, further comprising steps of:
   generating information on control dependence between statements contained in said program and storing the information in said storing means;
   accepting selection information selecting a particular piece of interface information from said interface information outputted;
   extracting a specific part of said program fragment that either or both (a) uses at least some said interface information selected by said accepted selection information as input, or (b) produces at least some said interface information selected by said accepted selection information as output, based on said data dependence information and said control dependence information stored in said storing means; and
   outputting said extracted specific part.

6. The program maintenance supporting method according to claim 5, wherein if an output variable that stores a value to be given to external from said program fragment has been selected as said interface information, said step of extracting said specific part comprises steps of:
   identifying a statement that affects determination of the value of said selected output variable;
   determining whether said identified statement is contained in said program fragment; and
   determining said statement as an extraction target if it is determined that said statement is contained in said program fragment.

7. The program maintenance supporting method according to claim 6, wherein said step of extracting said specific part comprises steps of:
   adding a relevance flag that indicates whether a statement has been determined as an extraction target to the information for a statement contained in said program and storing the information in said storing means;
   selecting a statement for which said relevance flag is added that indicates the statement has not been determined as an extraction target;
   identifying a statement that is relevant to the determination of the value of a variable that is referenced by said selected statement or to the determination of execution of the statement based on said data dependence information and said control dependence information stored in said storing means;
   determining whether said identified statement is contained in said program fragment;
   determining whether a relevance flag indicating that a statement has been determined as an extraction target is added to the information for said identified statement; and
   determining to extract said statement if said identified statement is contained in said program fragment and said relevance flag indicating that the identified statement has been determined as an extraction target is added to the information for the identified statement.

8. A program product embodied as a program stored on non-transitory computer-readable storage media, said program causing a computer to implement the operations of:
   generating information on data dependence between statements and variables in a program and storing, with respect to each of a plurality of statements of said program, the information on data dependence between the respective statement and one or more respective variables;

accepting specifying-information specifying a first statement and a last statement of a specific program fragment forming said program, said first statement and last statement defining a scope of said program fragment, said program fragment comprising at least one and fewer than all statements of said program;

extracting interface information on an interface of said program fragment specified by said operation of accepting specifying-information using said information on data dependence generated by said generating operation, wherein said operation of extracting interface information extracts as said interface information input variables and output variables of said program fragment, said operation of extracting interface information comprising:

(a) identifying a first set of statements that consists of statements that determine the value of variables contained in said program fragment;

(b) determining whether each statement of said identified first set of statements is contained in said program fragment using said specifying-information;

(c) extracting said variables as said input variables if it is determined that any one of said first set of statements is not contained in said program fragment;

(d) identifying a second set of statements that consists of statements that use the value of variables contained in said program fragment;

(e) determining whether each statement of said identified second set of statements is contained in said program fragment using said specifying-information; and (f) extracting said variables as output variables if it is determined that any one of said second set of statements is not contained in said program fragment; and outputting said extracted interface information.

9. The program product of claim 8, wherein extracting interface information further comprises associating a respective in-scope flag with each statement of said program indicating whether the respective statement is contained in said program fragment, wherein said (b) determining whether each statement of said identified first set of statements is contained in said program fragment and (e) determining whether each statement of said identified second set of statements is contained in said program fragment uses the respective said in-scope-flag of the respective statement.

10. The program product according to claim 8, causing the computer to further implement the operations of:

generating information on control dependence between statements contained in said program and storing the information in said storing means;

accepting selection information that selects a particular piece of interface information from said interface information outputted;

extracting a specific part of said program fragment that is relevant to said interface information selected by said accepted selection information based on said data dependence information and said control dependence information stored in said storing means; and outputting said extracted specific part.

* * * * *